US012664227B1

(12) United States Patent
Pandya et al.

(10) Patent No.: US 12,664,227 B1
(45) Date of Patent: Jun. 23, 2026

(54) SYSTEMS AND METHODS FOR INTERMITTENT WEB FORM GENERATION AND DISPLAY ON A USER INTERFACE

(71) Applicant: Veeva Systems Inc., Pleasanton, CA (US)

(72) Inventors: Raagi Pandya, Montreal (CA); Marius K. Mortensen, Burlington (CA); Yangyang Xu, Oakville (CA); Justine Tanya dela Cruz Lo, Dublin, CA (US)

(73) Assignee: Veeva Systems Inc., Pleasanton, CA (US)

( * ) Notice: Subject to any disclaimer, the term of this patent is extended or adjusted under 35 U.S.C. 154(b) by 179 days.

(21) Appl. No.: 18/617,843

(22) Filed: Mar. 27, 2024

(51) Int. Cl.
| | |
|---|---|
| *G06F 40/186* | (2020.01) |
| *G06F 16/958* | (2019.01) |
| *G06F 40/40* | (2020.01) |

(52) U.S. Cl.
CPC .......... *G06F 16/958* (2019.01); *G06F 40/186* (2020.01); *G06F 40/40* (2020.01)

(58) Field of Classification Search
CPC ....... G06F 16/958; G06F 40/186; G06F 40/40
See application file for complete search history.

(56) References Cited

U.S. PATENT DOCUMENTS

| | | | | |
|---|---|---|---|---|
| 2006/0287969 A1* | 12/2006 | Li | | G16B 40/00 |
| | | | | 702/19 |
| 2008/0228522 A1* | 9/2008 | Davis | | G16H 50/20 |
| | | | | 705/2 |
| 2012/0089418 A1* | 4/2012 | Kamath | | G16H 70/40 |
| | | | | 705/3 |
| 2020/0279623 A1* | 9/2020 | Ozeran | | G06F 16/215 |
| 2020/0294643 A1* | 9/2020 | Culbertson | | G16H 15/00 |

* cited by examiner

*Primary Examiner* — Rinna Yi

(57) ABSTRACT

A method for progressing a state of case dataset. The method includes receiving a source file and determining case data based on the source file. The method further includes generating a case dataset. The method further includes selecting a rule including a rule criteria and a sampling ratio. The method further includes determining the sampling ratio of the rule is fulfilled. The method further includes determining, in response to the sampling ratio being fulfilled, the case data of the case dataset fulfills the rule criteria. The method further includes selecting a web form template. The method further includes generating the web form based on the web form template and the case dataset. The method further includes outputting the web form and receiving input data. The method further includes modifying the state of the case dataset from the second stage to a third stage based on the input data.

20 Claims, 12 Drawing Sheets

200

204
Receive a Rule Including a Rule Criteria, a
Rule Trigger, and a Sampling Ratio 208
Receive a First Web Form Template Associated
with the Rule 212
Receive a Second Web Form Template Associated
with the Rule 216
Store the Rule in the Rule Repository 220
Store the First Web Form Template and the Second
Web Form Template in the Web Form Repository

300

304
Receive a Source File including Adverse Event Data

308
Determine Case Data based on the Source File

312
Generate a Case Dataset Including the Case Data

316
Modify a State of the Case Dataset to a First Stage

320
Store the Case Dataset in a Case Repository

SYSTEMS AND METHODS FOR INTERMITTENT WEB FORM GENERATION AND DISPLAY ON A USER INTERFACE

TECHNICAL FIELD

The present disclosure relates to systems and methods for intermittent web form generation and display on a user interface.

BACKGROUND

Researchers, scientists, industry players, academics, government regulators, and other stakeholders are increasingly in need of efficient and simple ways to intermittently generate web forms and display the web forms on a user interface.

SUMMARY

One embodiment relates to a method for progressing a state of case dataset. The method includes receiving a source file. The method further includes determining case data based on the source file. The method further includes generating the case dataset including the case data and the state in a first stage. The method further includes selecting a rule including a rule criteria and a sampling ratio from a first repository of the provider computing system. The method further includes determining the sampling ratio of the rule is fulfilled. The method further includes determining, in response to the sampling ratio being fulfilled, the case data of the case dataset fulfills the rule criteria. The method further includes selecting a web form template from a second repository of the provider computing system. The method further includes generating the web form based on the web form template and the case dataset. The method further includes outputting the web form and receiving input data. The method further includes modifying the state of the case dataset from the second stage to a third stage based on the input data.

Another embodiment relates to a method for progressing a state of a case dataset. The method includes selecting the case dataset including case data and the state in a first stage from a first repository of the provider computing system. The method further includes selecting a rule including a rule criteria and a rule trigger from a second repository of the provider computing system based on the state of the case dataset fulfilling the rule trigger of the rule. The method further includes determining the case data of the case dataset fulfills the rule criteria. The method further includes selecting a web form template from a third repository of the provider computing system. The method further includes generating the web form based on the web form template and the case dataset. The method further includes outputting the web form and receiving input data. The method further includes modifying the state of the case dataset from the first stage to a second stage based on the input data.

Another embodiment relates to a method for progressing a state of a case dataset. The method includes selecting the case dataset including case data and the state in a first stage from a first repository of the provider computing system. The method further includes selecting a first rule including a first rule criteria and a first sampling ratio from a second repository of the provider computing system. The method further includes determining the first sampling ratio of the first rule is not fulfilled. The method further includes selecting, in response to the first sampling ratio of the first rule not being fulfilled, a second rule including a second rule criteria, a second sampling ratio, and a bypass parameter from the second repository of the provider computing system. The method further includes determining the second sampling ratio of the second rule is fulfilled. The method further includes determining, in response to second sampling ratio being fulfilled, the case data of the case dataset fulfills the second rule criteria. The method further includes modifying, in response to the rule including the bypass parameter, the state of the case dataset from the first stage to a second stage.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
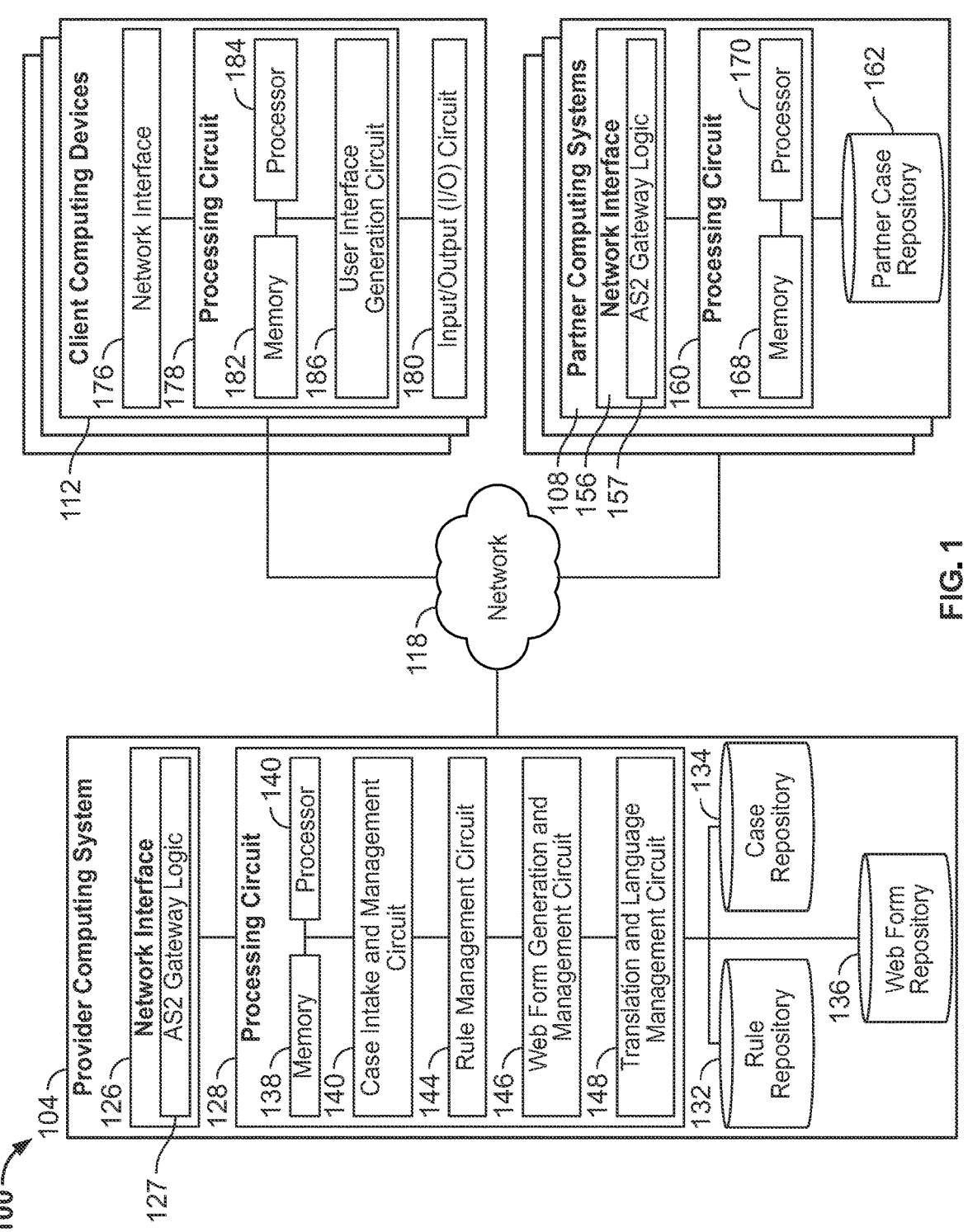
FIG. 1 may be a component diagram of a case generation and processing system, according to an example embodiment.

Referring generally to the figures, systems and methods for intermittent web form generation and display on a user interface are disclosed. The systems and methods described herein provide for the generation and processing of a case dataset and the intermittent generation of a QC checklist (i.e., a web form) in a linguistically-selective way, and thereby help and improve the pharmacovigilance industry by more accurately and efficiently, capturing, and performing QC reviews. For example, by utilizing a rule including rule criteria to determine when to generate the QC checklist as well as a sampling ratio, the present systems can speed up QC checklist generation and distribution, thereby shortening the time it takes for the QC review to be performed. For instance, because the present systems and methods select a rule including rule criteria and then generate a web form, in response to the rule criteria being met, the present systems and methods can automatically generate and distribute the web form, thereby not requiring manual correction and checks. Further, because the systems and methods described herein utilize a sampling ratio, the present systems do not perform a QC review every single time, and thereby use less computing power and memory than typical systems by skipping the QC process entirely, which also allows for quicker and more efficient case dataset generation and processing. Statistically speaking, this does not degrade the quality of the case dataset, while providing for a shortened and improved QC review process by performing a QC review on the most-important (e.g., serious) case datasets, while only performing a QC review at a specific sampling ratio on the less-important (e.g., non-serious) case datasets.

Additionally, by providing for linguistically-selective generation of the web form, the present systems and methods provide for an improvement to case dataset processing systems. For instance, in typical case dataset follow-up generation, a web form may be generated in a single language (e.g., English) which is then provided to QC reviewers who speak different languages thereby resulting in low conversion rates, and less accurate responses. In comparison, because the web form is generated to include text data in the language of the recipient (e.g., the QC reviewer), the present systems and methods provide for improved engagement and more accurate QC review. For instance, because the web form is generated to include text data in the language of the recipient, the present systems and methods tailor the file's language to the recipient resulting in the recipient being more likely to understand and engage with the web form, leading to better user experience and higher conversion or response rates, as well as requiring less processing power to follow-up on the web form multiple times. Likewise, because the web form is generated to include text data in the language of the recipient, the present systems and methods result in more accurate responses (e.g., input data). For instance, by knowing and utilizing the language the recipient prefers, the present systems and methods provide tailored questions and better context. This provides for improved and more accurate responses that are more aligned with the intended meaning of the QC review and the case dataset which is being checked.

As used herein, the term "event," "medical event," or "adverse event" can include any untoward medical occurrence which happens to either a patient or a subject in a clinical investigation or during regular use of a medical product that has been given to that person. For example, the "event," "medical event," or "adverse event" may encompass any signs which are unfavorable and unexpected for the patient or subject, including any abnormal laboratory findings such as a high blood pressure, a rapid heart rate, etc. The "event," "medical event," or "adverse event" could be symptoms, or a disease temporally associated with the use of a medical product and does not have to have been previously associated with that product. The term "event," "medical event," or "adverse event" can further encompass adverse reactions and serious adverse events such as death, life-threatening adverse experiences, inpatient hospitalization, congenital birth defects, disabilities, etc. Further, each "event," "medical event," or "adverse event" may be defined by the Medical Dictionary for Regulatory Activities (MedDRA) (or other medical code dictionaries) and associated with a specific MedDRA code. Moreover, "event information" "medical event information" "adverse event information" "event data" "medical event data" or "adverse event data" can include information associated with the event such as the date of onset of the event, the date of cessation of the event, the type of event, the dictionary (i.e., digital dictionary, medical dictionary, digital medical dictionary, etc.) or medical term (e.g., MedDRA term), the dictionary or medical code (e.g., MedDRA code), event comments, the outcome of the event, the location of the event (e.g., country where the event occurred), the event duration, patient data for a patient who endured or to which the event occurred, medical products (and associated medical product data) or substances that the patient consumed and/or dosages for the consumed medical products, the event rank, event contacts, the event type, and any associated event documents.

As used herein, the term "case" or "case dataset" can include an Individual Case Safety Report (ICSR) as defined by the standard ISO/HL7 27953 of the International Standards Organization (ISO) as well as any past or future standards governing ICSRs of the ISO, the World Health Organization (WHO), the Food and Drug Administration (FDA), the European Medicines Agency (EMA), or other national health agencies governing ICSRs. Moreover, "case information" "case data" or "case dataset" can include information associated with or included in the case such as adverse event data, case contact or reporter data, a case identifier (e.g., case worldwide ID (WWID), case number, etc.), case priority data, case seriousness data, case documents, medical product data (e.g., substances in the medical product, medical product registrations, medical product dosages, medical product name, etc.) patient data, and other data associated with a case as defined by the standard ISO/HL7 27953 as well as any past or future standards governing ICSRs of the ISO, the WHO, the FDA, the EMA, or other national health agencies governing ICSRs.

As used herein, the term "web form" can include a world-wide web form or a world-wide web page which includes multiple interactive elements that allow a user to enter and submit information. For instance, the "web form" can include one or more digital pharmacovigilance quality control (QC) review checklists which are a standardized tool used to gather information about whether a case dataset was properly entered and intaken. In this regard, the "web form" can include a checklist which reviews or confirms specific portions of the case dataset were properly entered and intaken. QC review checklists can be utilized during a QC stage (referred to as "In-Process"), or after the case dataset was submitted to the relevant health authorities (referred to as "Post-Closure").

As used herein the terms "data" and "information" are interchangeable such that one may be substituted for the other and vice versa.

Referring now to FIG. 1, a system 100 for generating and processing case datasets as well as generating web forms, in response to rule criteria being met, is shown, according to an example embodiment. The system 100 includes a provider computing system 104, multiple partner computing systems 108, and multiple client computing devices 112 connected by a secure network (e.g., a network 118).

The network 118 communicably and operably couples the provider computing system 104, the partner computing devices 108, and the client computing devices 112 such that communicable and operable computing may be provided between the provider computing system 104, the partner computing devices 108, and the client computing devices 112 over the network 118. In various embodiments, the network 118 includes any combination of a local area network (LAN), an intranet, the Internet, or any other suitable communications network, directly or through another interface.

The provider computing system 104 may be operated and managed by a provider (e.g., a software as a service (SaaS) provider, a cloud services provider, a software provider, a service provider, etc.) and may be a computer system including one or more servers (e.g., a cloud computing server) each including one or more processing circuits. In some embodiments, the provider computing system 104 may act as a host and provide an application (e.g., a web-based application, a mobile application, etc.) to the client computing devices 112 over the network 118 in response to authenticating the respective computing device. For example, the provider computing system 104 may receive authentication data (e.g., a username and corresponding password, a limited-use key, a two-factor authentication code or key, etc.) from one of the client computing devices 112. The provider computing system 104 may then authenticate the client computing device 112 based on the authentication data and provide an application to the client computing device 112 over the network 118. In some examples, the provider computing system 104 may be a multi-tenant system where various elements of hardware and software may be shared by one or more customers. In a multi-tenant system, a user is typically associated with a particular customer. In one example, a user (e.g., of the client computing device 112) could be an employee of one of a number of (pharmaceutical) companies which are tenants, or customers, of the provider computing system 104.

In some embodiments, the provider computing system 104 may run on a cloud computing platform. Users can access content on the cloud independently by using a virtual machine image or purchasing access to a service maintained by a cloud repository provider.

In some embodiments, the provider computing system 104 may be provided as Software as a Service ("SaaS") to allow users to access the provider computing system 104 with a thin client.

As shown, the provider computing system 104 may include a network interface 126, a processing circuit 128, a first repository 132 (also referred to as a rule repository 132), a second repository 134 (also referred to as a case repository 134), and a third repository 136 (also referred to as a web form repository 136). In some embodiments, the provider computing system 104 may include an input/output circuit (e.g., similar to (e.g., the same as) an input/output circuit 180 as will described further herein).

The network interface 126 is structured to establish connections with the partner computing devices 108 and the client computing devices 112 by way of the network 118. The network interface 126 includes program logic (e.g., AS2 Gateway Logic 127) and/or hardware-based components that connect the provider computing system 104 to the network 118. For example, the network interface 126 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 126 includes the hardware and machine-readable media structured to support communication over multiple channels of data communication (e.g., wireless, Bluetooth, near-field communication (NFC). In some embodiments, the network interface 126 includes cryptography logic and capabilities to establish a secure communications session.

The AS2 gateway logic 127 includes programmable instructions that facilitate communication (transmission and receipt) using the Applicability Statement 2 (AS2) communication protocol (as specified in Request for Comment (RFC) 4130) over the network 118 via the network interface circuit 126. For example, using the AS2 gateway logic 127, the network interface 126 may transmit or receive files (e.g., the source file, a case, etc.) or other data to the partner computing systems 108 or client computing devices 112 using the AS2 Gateway protocol. In other embodiments, the AS2 gateway logic 127 may transmit or receives files using the most updated Applicability Statement communication protocol (e.g., AS3, etc.).

The processing circuit 128, as shown, comprises a memory 138, a processor 140, a case intake and management circuit 140, a rule management circuit 144, a web form generation and management circuit 146, and a translation and language management circuit 148. The memory 138 includes one or more memory devices (e.g., RAM, NVRAM, ROM, flash memory, hard disk storage, etc.) that store data and/or computer code for facilitating the various processes described herein. That is, in operation and use, the memory 138 stores at least portions of instructions and data for execution by the processor 140 to control the processing circuit 128. The memory 138 may be or include tangible, non-transient volatile memory and/or non-volatile memory. The processor 140 may be implemented as a general-purpose processor, an application specific integrated circuit (ASIC), one or more field programmable gate array (FPGAs), a digital signal processor (DSP), a group of processing components or other suitable electronic processing components.

As described herein, the case intake and management circuit 140 is structured or configured to receive, generate, store, and manage case datasets. For instance, the case intake and management circuit 140 may be configured or structured to periodically receive or retrieve a source file including adverse event data associated with an adverse event from a trusted source (e.g., one of the partner case repositories 162). In some embodiments, the case intake and management circuit 140 may then match the adverse event data with medical product data of a medical product repository (not shown), generate a case dataset including case data, and store the case dataset within the case repository 134. In one example, the case intake and management circuit 140 may be an instance of Vault Safety®. In some embodiments, the provider computing system 104 may include multiple case intake and management circuits 140 (e.g., one for each customer, one for each user, etc.). In some embodiments, when generating the case dataset, the case intake and management circuit 140 may further search the case repository 134 for case datasets which may be a duplicate of the newly generated case (e.g., potential duplicate cases). Then, in response to determining that the potential duplicate cases are not a duplicate, the case intake and management circuit 140 may generate the case dataset. In some embodiments, the case intake and management circuit 140 may output (via the network interface circuit 126) one or more of the case datasets as a specific file type (e.g., E2B (R3) XML file, as a Council for International Organizations of Medical Sciences (CIOMS) II PDF file, as a 3500A PDF file, etc.) to one or more of the partner computing systems 108 or the client computing devices 112.

Additionally, the case intake and management circuit 140 may be configured or structured to modify a state of the case dataset, in response to certain criteria being met, from a first stage to a second stage to a third stage, and so on. For instance, the case intake and management circuit 140 may generate a new case and set the state of the case dataset as a beginning stage (e.g., "data entry"). Then, in response to certain criteria being met (e.g., receiving a verification that the case data of the case dataset is correct), the case intake and management circuit 140 may modify the state of the case dataset from the beginning stage to a second stage (e.g., "in-review"). Then, when additional criteria are met (e.g., a quality-control (QC) web form is completed), the case intake and management circuit 140 may modify the state of the case dataset from the second stage to a third stage (e.g., "submission"). This process may be repeated until reaching a final stage (e.g., "Complete"), as will be described further herein.

As described herein, the rule management circuit 144 is structured or configured to receive a specific rule (also referred to as an event) from one of the client computing devices 112 and store the rule in the rule repository 132. Rules or events will be described further herein, but may include multiple rule criteria, a destination address, a rank or order, a rule trigger, and a bypass parameter. The rule criteria may include specific data fields that indicate the rule is fulfilled. For instance, the rule criteria may include a specific adverse event of a case dataset (e.g., a specific MedDRA code and term), a specific seriousness of a case dataset (e.g., serious-results in death, serious-hospitalization, non-serious, etc.), a specific medical product (e.g., a specific national drug code (NDC), a specific substance, a specific combination of substances, etc.), a specific reporter language (e.g., Chinese, English, etc.), and the like. Similarly, the rule trigger may be an event or change in the data that indicates the rule is triggered, and the provider computing system 104 is to determine if the rule is fulfilled. For instance, the rule trigger may include a specific state of a case dataset (e.g., completed, submitted, new, data entry required, a QC stage, etc.), a specific period of time (e.g., every minute, every five minutes, once a year on January 1, etc.)), and/or a specific date/time (e.g., Jan. 1, 2021). In one example, in response to the case dataset entering or reaching a specific state (e.g., the stage or state of the case dataset being modified to the state), the provider computing system 104 may determine the rule trigger is met and determine if the case data fulfills the rule criteria of the rule. The bypass parameter will be described further herein, but may be a parameter or preference which indicates the provider computing system 104 is to bypass the generation of the web form. Further, the bypass parameter may indicate the provider computing system 104 is to perform a specific action, which would take place in response to the web form being completed or responded to (e.g., the state of the case dataset being modified from a first stage to a second stage, etc.). Likewise, the destination address will be described further herein, but may include an electronic address (e.g., an email address, an internet protocol (IP) address, a file transfer protocol (FTP) address, a AS2 address, and the like) to which a web form is to be provided, in response to the rule criteria being met.

Additionally, the rule management circuit 144 may be structured or configured to periodically (e.g., every minute, every half-minute, every time a case dataset changes state) determine if any of the rules are fulfilled (e.g., based on the rule trigger). For instance, in response to a case dataset being changed to the completed or "approved" state, the rule management circuit 144 may determine if the case dataset meets or fulfills any of the rules of the rule repository 132. For instance, the rule management circuit 144 may select each rule, in the order they are listed (e.g., rule including the order 1, followed by the rule including the order 2, and so on). Then, in response to determining the rule criteria of the rule matches the case dataset, the rule management circuit 144 may execute the rule, or provide an indication to the web form generation and management circuit 146 to execute the rule, as will be described further herein.

The web form generation and management circuit 146 is structured or configured to receive a web form template from one or more of the client computing devices 112, and then store the web form template in the web form repository 136. For instance, the web form generation and management circuit 146 may receive a web form template for a questionnaire that is provided to QC users, in response to a case dataset reaching the QC stage. In another example, the web form generation and management circuit 146 may receive a first web form template for a post-submission QC questionnaire or checklist that is provided to QC users who speak or utilize a first language, in response to a case dataset including a specific adverse event (e.g., hand cramping) and medical product (e.g., drug X). Further, the web form generation and management circuit 146 may receive a second web form template for the questionnaire that is provided to QC users who speak or utilize a second language, in response to the case including a specific adverse event and medical product.

Additionally, in response to a specific rule being met (e.g., a case dataset matching the rule criteria of the rule), the web form generation and management circuit 146 may receive an indication of such, select a specific web form template from the web form repository 136, and generate a web form based on the web form template and the case dataset. For instance, the web form generation and management circuit 146 may generate the web form based on (e.g., using or copying the web form template) and populate the web form with case data of the case dataset (e.g., reporter initials, date information, case identifier(s), etc.). In some embodiments, the web form generation and management circuit 146 may further output or transmit the web form, in response to receiving a request to do so, as will be described further herein.

The translation and language management circuit 148 is structured or configured to translate specific words, terms, and fields that are to be provided to the client computing device 112 for display based on a display language of the user (e.g., a display language that is received by the provider computing system 104 from the client computing device 112) or the follow-up case data, as will be described further herein. For example, the translation and language management circuit 148 may translate text fields or labels of the web form based on a specific language of the reporter.

Still referring to FIG. 1, the rule repository 132 may be repository (e.g., a database) that is structured or configured to receive, store, and manage rules or events of users or customers. In this regard, the rule repository 132 may receive, store, and manage rules including rule criteria, destination address(es), rule triggers, bypass parameters, associated web form templates, timeframes between attempts, a total number of attempts, and the like. For example, a customer may provide or generate a rule that includes a rule criteria of a first medical product, a first adverse event, a specific destination address (e.g., an email address), a specific web form template, and a specific rule trigger (e.g., a specific case stage (e.g., completed or submitted)). Accordingly, the rule repository 132 may receive the rule from one of the client computing devices 112 and store it therein. Then, in response to a case entering the specific case state, the rule management circuit 144 may select the rule from the rule repository 132 and determine if each of the rule criteria is met. Accordingly, the rule repository 132 can be structured according to various database types, such as, relational, hierarchical, network, flat, point-in time, and/or object relational. Further, the rule repository 132 may include a plurality of nonvolatile/non-transitory storage media such as solid-state storage media, hard disk storage media, virtual storage media, cloud-based storage drives, storage servers, and/or the like.

Likewise, the case repository 134 may be repository (e.g., a database) that is structured or configured to receive, store, and manage case datasets and their respective data (e.g., case data, adverse event data, etc.). For example, the case repository 134 may receive case datasets and related case objects and store the case datasets therein. Then, in response to receiving a query or a request for one or more case datasets (e.g., a query for all cases that include a specific substance), the case repository 134 may provide and/or return the case datasets stored therein that match the query or request. For example, the case repository 134 may receive a query from the case intake and management circuit 140 for all cases that include a specific criteria (e.g., a specific medical product, a specific country of origin, a specific date range). In response, the case repository 134 may determine each case dataset that includes the specific criteria stored therein and return each case dataset. In some embodiments, as will be described further herein, the case repository 134 may receive, store, and manage multiple versions for each case dataset. For instance, in response to receiving follow-up case data, the case intake and management circuit 140 may select the corresponding case dataset (e.g., version 1.0), version the case dataset (e.g., to version 1.5), and store the new version of the case dataset in the case repository 134. In this regard, the case repository 134 may store the original version of the case dataset and the versioned or updated version of the case dataset.

Further, the case repository 134 can be structured according to various database types, such as, relational, hierarchical, network, flat, point-in time, and/or object relational. In some embodiments, the case repository 134 includes a plurality of nonvolatile/non-transitory storage media such as solid-state storage media, hard disk storage media, virtual storage media, cloud-based storage drives, storage servers, and/or the like.

The web form repository 136 may be a repository (e.g., a database) that is structured or configured to receive, store, and manage web forms and web form templates. In this regard, the web form repository 136 may receive, store, and manage web forms and web form templates including text sections, an ad-hoc question option or preference, an ad-hoc section option or preference, a subject field, text fields, text labels, and the like. For example, a customer may provide or generate a web form template that includes multiple text sections (e.g., four text sections) with each section including multiple text fields or labels. Then, in response to an associated or corresponding rule being met, the web form generation and management circuit 146 may select the web form template from the web form repository 136 and generate a web form based on the web form template. The web form generation and management circuit 146 may then store the web form in the web form repository 136. Accordingly, the web form repository 136 can be structured according to various database types, such as, relational, hierarchical, network, flat, point-in time, and/or object relational. Further, the web form repository 136 may include a plurality of nonvolatile/non-transitory storage media such as solid-state storage media, hard disk storage media, virtual storage media, cloud-based storage drives, storage servers, and/or the like.

While not shown, in some embodiments, the provider computing system 104 may include a separate repository for each data type described herein. For instance, the provider computing system 104 may include the case repository 134, the rule repository 132, the web form repository 136, a reporter repository (not shown), a medical product repository (not shown), an adverse event repository or dictionary, a public access link (PAL) repository, a study repository (not shown), and the like.

Still referring to FIG. 1, the partner computing systems 108 may be managed by third-party partners (e.g., the FDA, the EHA, Health Canada, partner company 1, partner company 2, partner computing system xyz, etc.) and can be or include a computing device or system configured to communicate with the provider computing system 104 over the network 118. For instance, the partner computing systems 108 can each be a server computer system, a gateway computing system, a laptop computer a desktop computer, and any other network-connected device that can communicate over the network 118. For example, one of the partner computing systems 108 may be the Electronics Submission Gateway (ESG) of the FDA through which one or more E2B XML files may be received from and/or provided to. In another example, one of the partner computing systems 108 may be a laptop computer operated by an employee of a partner company.

In operation, the partner computing systems 108 may communicate with the provider computing system 104 or the client computing device 112 to send and/or receive one or more electronic communications (e.g., case datasets, source files, etc.). For instance, a customer (e.g., pharma company 123) may submit case datasets to the FDA over the ESG of the FDA. Accordingly, the provider computing system 104 may provide case datasets to the first partner computing system associated with the FDA. For instance, the provider computing system 104 may generate an outbound transmission including one or more case datasets. Then, the provider computing system 104 may output the outbound transmission to the first partner computing system 108.

As shown, each partner computing system 108 includes a network interface 156, a processing circuit 160, and a partner case repository 162. In some embodiments, each partner computing system 108 further includes a key repository (not shown) for storing AS2 keys and certificates, which are used to encrypt AS2 transmission (e.g., E2B files).

The network interface 156 is structured to establish connections with the provider computing system 104 and/or the client computing device 112 by way of the network 118. The network interface 156 includes program logic (e.g., AS2 Gateway logic 157) and/or hardware-based components that connect each partner computing system 108 to the network 118. For example, the network interface 156 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 156 includes the hardware and machine-readable media structured to support communication over multiple channels of data communication (e.g., wireless, Bluetooth, near-field communication (NFC). In some embodiments, the network interface 156 includes cryptography logic and capabilities to establish a secure communications session.

The AS2 gateway logic 157 includes programmable instructions that facilitate communication (transmission and receipt) using the Applicability Statement 2 (AS2) communication protocol (as specified in Request for Comment (RFC) 4130) over the network 118 via the network interface circuit 156. For example, using the AS2 gateway logic 157, the network interface 156 may transmit or receive files (e.g., the source file, a case, etc.) or other data to the provider computing system 104 or client computing devices 112 using the AS2 Gateway protocol. In other embodiments, the AS2 gateway logic 157 may transmit or receives files using the most updated Applicability Statement communication protocol (e.g., AS3, etc.).

The processing circuit 160, as shown, comprises a memory 168 and processor 170. The memory 168 includes one or more memory devices (e.g., RAM, NVRAM, ROM, flash memory, hard disk storage, etc.) that store data and/or computer code for facilitating the various processes described herein. That is, in operation and use, the memory 168 stores at least portions of instructions and data for execution by the processor 170 to control the processing circuit 160. The memory 168 may be or include tangible, non-transient volatile memory and/or non-volatile memory. The processor 170 may be implemented as a general-purpose processor, an application specific integrated circuit (ASIC), one or more field programmable gate array (FP-GAs), a digital signal processor (DSP), a group of processing components or other suitable electronic processing components.

The partner case repository 162 may be similar or the same as the case repository 134 and is a repository (e.g., a database, cloud storage, etc.) that is structured or configured to receive, store, and manage case datasets associated with adverse events. For example, one of the partner computing systems 108 may receive a case dataset from the provider computing system 104 and store case dataset in the partner case repository 162. Further, the partner case repository 162 can be structured according to various database types, such as relational, hierarchical, network, flat, point-in time, and/or object relational. In some embodiments, the partner case repository 162 includes a plurality of nonvolatile/non-transitory storage media such as solid-state storage media, hard disk storage media, virtual storage media, cloud-based storage drives, storage servers, and/or the like.

Still referring to FIG. 1, the client computing devices 112 can each be any type of computing device or computing system. For instance, each client computing device 112 can be one or more of a mobile phone, a tablet computer, a laptop computer, a smart watch, a server computer system, or any other internet-connected device. In this regard, each client computing device 112 may be an access-controlled or privileged access device. For instance, a client computing device 112 which provides a specific set of login credentials (e.g., admin credentials) may have additional privileges and thereby access to additional data and features as compared to another client computing device 112 which provides another set of login credentials (e.g., general case processor credentials). In operation, the client computing devices 112 may communicate and interface with the provider computing system 104 via the network 118 to provide and setup one or more rules including rule criteria, web form template(s), and/or rule triggers to be used in processing the rule. As shown, each client computing device 112 may include a network interface 176, a processing circuit 178, and the input/output (I/O) circuit 180.

The network interface 176 is structured to establish connections with the provider computing system 104 by way of the network 118. The network interface 176 includes program logic and/or hardware-based components that connect the client computing device 112 to the network 118. For example, the network interface 176 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 176 includes the hardware and machine-readable media structured to support communication over multiple channels of data communication (e.g., wireless, Bluetooth, near-field communication (NFC). In some embodiments, the network interface 176 includes cryptography logic and capabilities to establish a secure communications session.

The processing circuit 178, as shown, comprises a memory 182, a processor 184, and a user interface generation or rendering circuit 186. The memory 182 includes one or more memory devices (e.g., RAM, NVRAM, ROM, flash memory, hard disk storage, etc.) that store data and/or computer code for facilitating the various processes described herein. That is, in operation and use, the memory 182 stores at least portions of instructions and data for execution by the processor 184 to control the processing circuit 178. The memory 182 may be or include tangible, non-transient volatile memory and/or non-volatile memory. The processor 184 may be implemented as a general-purpose processor, an application specific integrated circuit (ASIC), one or more field programmable gate array (FP-GAs), a digital signal processor (DSP), a group of processing components or other suitable electronic processing components.

The user interface rendering circuit 186 may be configured to receive a user interface (a web interface in an HTML file and related files, a downloaded graphical user interface, etc.) from the provider computing system 104 and render the user interface on the client computing device 112 via the I/O circuit 180. In this way, the provider computing system 104 may generate one or more user interfaces and provide the one or more user interfaces to the user interface generation circuit 186 to be rendered on the client computing device 112 (e.g., on a display of the I/O circuit 180 of the client computing device 112). For instance, the provider computing system 104 may generate the web form, at step 420. Then, in response to receiving the request to access the web form, the provider computing system 104 may generate the user interface including the web form, and provide the user interface to the client computing device 108 for rendering and display thereon.

The I/O circuit 180 is structured to receive communications from and provide communications to the user of the client computing device 112 (e.g., the user). In this regard, the I/O circuit 180 is structured to exchange data with the processing circuit 178 to provide output to the user and to receive input from the user. As a result, the I/O circuit 180 may include a display that may be manipulated by the application. In some embodiments, the I/O circuit 180 may also include a keyboard, a mouse, a joystick, a touch screen, touch areas, soft keys, a microphone, a speaker, a vibration mechanism, a sensor, a RFID scanner, or other input/output devices described herein.

Figure 2:
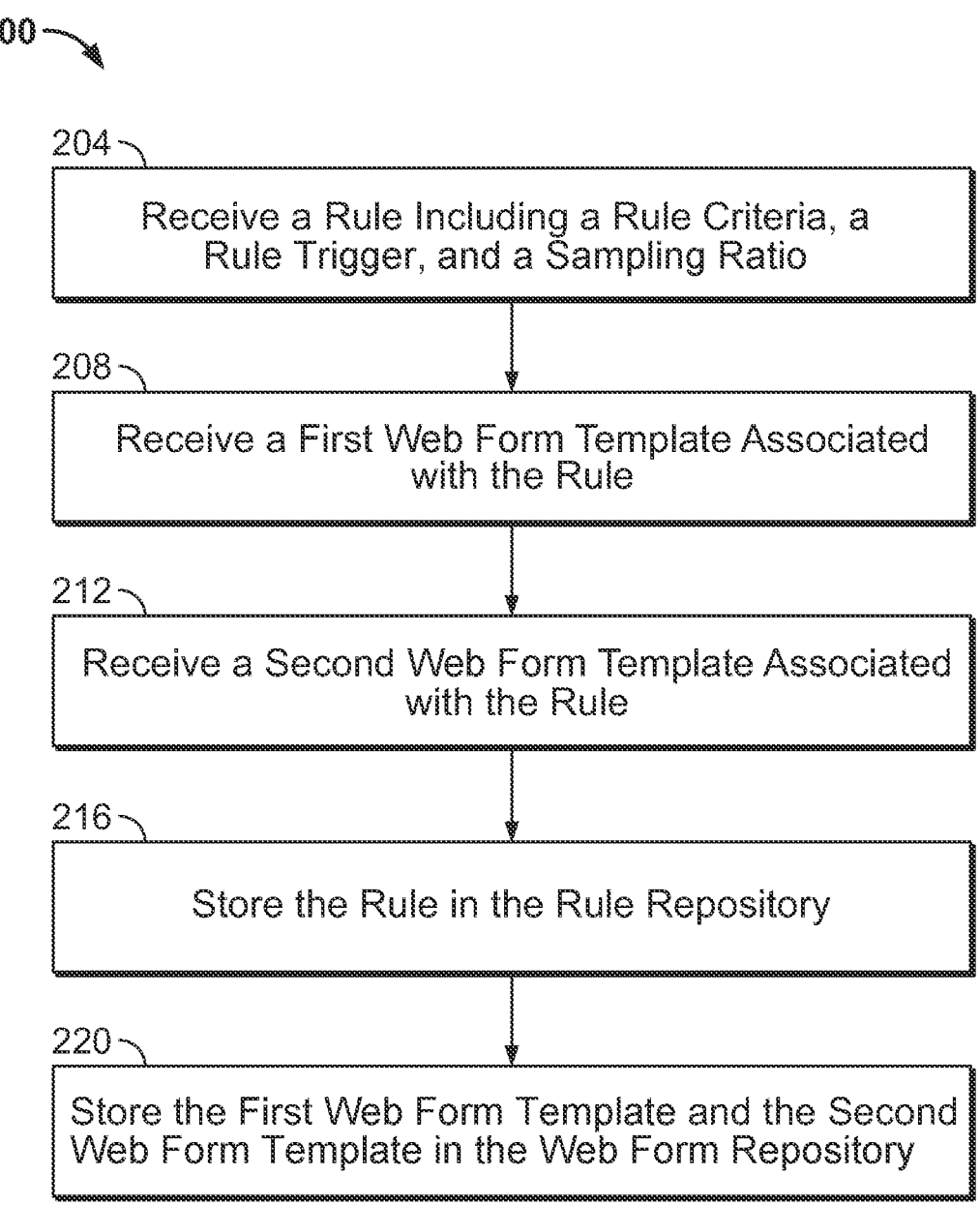
FIG. 2 may be a flow diagram of a method for storing a rule and one or more web form templates, according to an example embodiment.

Referring now to FIG. 2, a method 200 of receiving and storing a rule and multiple web form templates is shown, according to an example embodiment. Method 200 can be carried out by the system of FIG. 1. More particularly, the method 200 can be carried out by the processing circuit 128 of the provider computing system 104 and through communication with the client computing devices 112.

Method 200 commences at step 204 at which the provider computing system 104 receives a rule (also referred to as an event) from one of the client computing devices 112. In some embodiments, the rule may be received from a client computing device 112, in response to the client computing device 112 providing admin-level credentials (e.g., an admin username and matching password, an admin username and 2-factor authentication, etc.). The rule may include multiple rule criteria. For instance, the rule may include medical product data or identifier (e.g., an NDC), a case dataset state (e.g., closed, submitted, quality review passed, etc.), an adverse event (e.g., a MedDRA term and code, etc.), a seriousness (e.g., serious-results in death, serious, non-serious, etc.), a report type (e.g., spontaneous, post-marketed, from study, etc.), and other criteria that match case data described herein (e.g., a reporter criteria, a patient criteria (e.g., is pregnant, is Male, etc.). Likewise, the rule may include one or more rule triggers, which indicates the rule criteria of the rule are to be assessed for being fulfilled, as well as a destination address (e.g., the reporter email "johnsmith@gmail.com," a specific FTP address, a specific IP address, etc.), sampling ratio (also referred to as a sampling rate), which indicates the number of times the rule runs or is skipped, a bypass preference, a timeframe or number of days between attempts, a total number of attempts to make, and a rank or order. For instance, a specific rule (e.g., "Drug X-Arm Pain Follow-up Questionnaire) may include multiple rule criteria including the NDC of Drug X, the MedDRA code associated with Arm pain. Further, the specific rule may include an order of "1" and the destination address of "johnsmith@gmail.com,".

Once the provider computing system 104 has received the rule, the method 200 proceeds to step 208, at which the provider computing system 104 receives a first web form template associated with the rule. The first web form template may be received from one of the client computing devices 112 (e.g., the same client computing device 112 that provided the rule, a different client computing device 112 than the client computing device 112 that provided the rule, etc.). Further, the web form template may be a template that defines a specific web form. In some embodiments, the web form template may be the same file type as the web form. In other embodiments, the web form template may be a different file type than the web form. Further, the web form template may be at least one of a Word file (DOC), an Excel file (XLS), a Comma-separated value (CSV) file, an XML file, a PDF file, a hypertext markup language (HTML) file, a Cascading Style Sheet (CSS) file, a TIFF file, a text (TXT) file, or other files configured to layout and define the web form. Additionally, the web form template may include or identify a specific language the web form is to include, a specific country or countries in which the web form is to be used, an ad-hoc question option or preference, an ad-hoc section option or preference, a subject field, text fields, text labels, and the like. For instance, the web form template may include multiple text sections, each section including text data such as a text label (e.g., "Was there any discrepancies between the source file and the entered case data?" and a text field in which a response may be added. In another example, the text section may include a text label (e.g., "A1.1 Report Type") and multiple selectable options (e.g., "0-No anomalies found," "1-Minor Anomalies Found-No Resubmit," and "2-Major Anomalies Found-Resubmit"). In some embodiments, the web form template may include an ad-hoc section option, which when set to "yes" or "on," allows one or more users to add a text section to the generated web form. Further, the web form template may include an ad-hoc question or field option, which when set to "yes" or "on,"

allows one or more users to additional text data (e.g., a question, a text label and a text field, etc.) to one of the text sections of the web form.

Once the provider computing system 104 has received the first web form template, the method 200 proceeds to step 212 at which the provider computing system 104 receives a second web form template associated with the rule. The second web form template may be received from one of the client computing devices 112 (e.g., the same client computing device 112 that provided the rule, the same client computing device 112 that provided the first web form template, a different client computing device 112 than the client computing device 112 that provided the rule, etc.). The second web form template may be similar to the first web form template (i.e., include the same or similar data as the first web form template). For instance, the web form template may be a template that defines a specific web form. In one example, the first web form template may define a product-specific web form that is provided to any QC reviewer who is performing QC on a case dataset associated with the specific medical product (e.g., "Cholecap QC Checklist"), whereas the second web form may define a product and adverse event pair-specific web form that is provided to any QC reviewer who is performing QC on a case dataset associated with the specific medical product (e.g., "Cholecap-Arm Pain QC Checklist").

In some embodiments, the second web form template may define the same web form as the first web form template, but include text sections and text data that is in a different language. For instance, the first web form template may include multiple text sections, each text section including text data in a first language (e.g., ""0—No anomalies found," "1—Minor Anomalies Found-No Resubmit," and "2—Major Anomalies Found-Resubmit"). Similarly, the second web form template may include multiple text sections, each text section including text data in a second language (e.g., "0: no se encontraron anomalías", "1: se encontraron anomalías menores: no se debe volver a enviar", and "2: se encontraron anomalías importantes: se debe volver a enviar"). The web forms may be the same web forms, but include different languages. In other embodiments, the first web form template may include multiple text sections including a first text section in a first language and a second text section in a second language. Then, when generating the web form based on the first web form template, the provider computing system 104 may select a specific text section to be included in the web form, based on the language of the recipient of the web form, as will be described further herein.

Once the provider computing system 104 has received the second web form template, the method 200 proceeds to step 216 at which the provider computing system 104 stores the rule in the rule repository 132. As described herein, the rule may be stored in association with or a digital link to the first web form template and the second web form template, as well as the user or customer who provided the rule.

Once the provider computing system 104 has stored the rule in the rule repository 132, the method 200 proceeds to step 220 at which the provider computing system 104 stores the first web form template and the second web form template in the web form repository 136. In some embodiments, the first web form template and the second web form template are stored in a web form template repository (not shown), which is separate from the web form repository 136 where web forms are stored.

In some embodiments, during the method 200, the provider computing system 104 may receive additional rules and/or web form templates. For instance, the provider computing system 104 may receive a first rule including first rule criteria and a first rule trigger, and a second rule including second rule criteria, a second rule trigger, and a bypass parameter. Then, the provider computing system 104 may store each of the rules in the rule repository 132. In other embodiments, the provider computing system 104 may receive 3, 4, 5, 6, or more rules during step 200. For instance, the provider computing system 104 may receive a first rule including a first rule trigger (e.g., the case stage of "Review"), first rule criteria, and a first web form template (e.g., "Non-serious QC Checklist). Further, the provider computing system 104 may receive a second rule including a second rule trigger (e.g., the case stage of "Completed"), second rule criteria, and a second web form template (e.g., "Post-Submission QC Checklist).

Likewise, the provider computing system 104 may receive three web form templates. The first web form template may include text data in a first language; the second web form template may include text data in a second language; and the third web form template may include text data in a third language. The provider computing system 104 may then store each of the web form templates in the web form repository 136. In other embodiments, the provider computing system 104 may receive 3, 4, 5, 6, or more web form templates during the method 200. For example, the provider computing system 104 may receive a first rule which is associated with a received first web form template and a received second web form template. Next, the provider computing system may receive a second rule which is associated with the received first web form template and a received third web form template. Further, the provider computing system 104 may receive a third rule which is associated with the received first web form template and a received fourth web form template. The first web form template may be associated with a specific medical product (e.g., Drug X QC Checklist), whereas the second through fourth web form templates may be each associated with a specific medical product-adverse event pair (e.g., Drug X-Arm Pain QC Checklist, Drug X-Headache QC Checklist, Drug X-Cardiac Arrest QC Checklist, etc.).

In some embodiments, steps 208, 212, and 220 may take place prior to step 204 and 216. For instance, the provider computing system 104 may receive the first web form template and the second web form template, and then store the first web form template and the second web form template in the web form repository 136. Then, the provider computing system 104 may receive a rule which identifies or references the first web form template and the second web form template. Then, the provider computing system 104 may store the rule in the rule repository 136 including an association or link to each of the web form templates.

Figure 3:
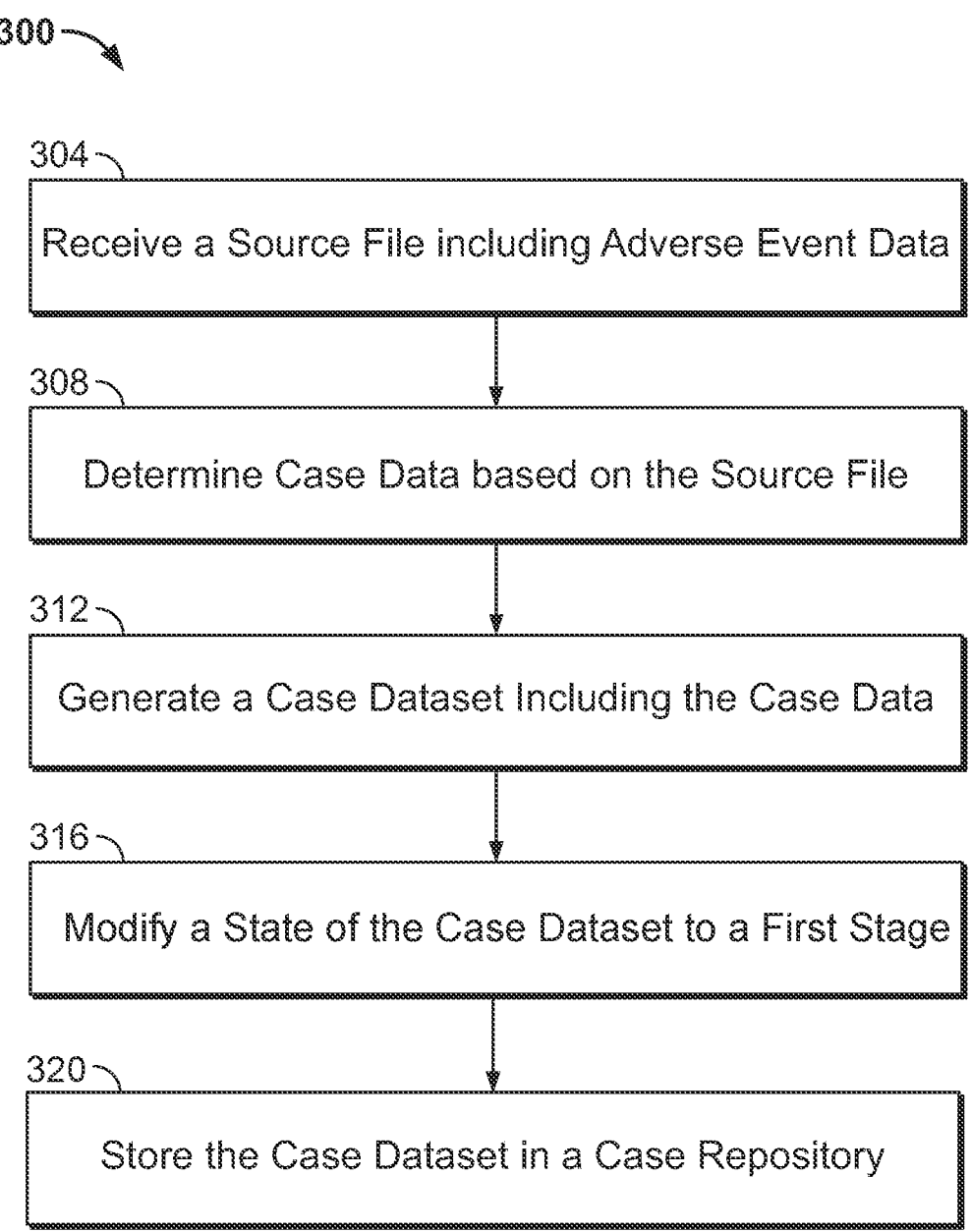
FIG. 3 may be a flow diagram of a method for generating a case dataset, according to an example embodiment.

Referring now to FIG. 3, a method 300 of generating a case dataset is shown, according to an example embodiment. While different overall, it should be understood that any steps or discussion of the method 300 may be applied or included within the method 200 or the method 400, and vice versa, and that such combinations are included within the scope of the present disclosure. For example, the method 200 may include any of the steps 304-320 or steps 404-448, after or before any steps included in the method 200, and the method 300 may include any of the steps 204-220, after or before any of the steps included in the method 300. Likewise, the method 400 may include any of the steps 204-220 or 304-320, after or before any of the steps in the method 400. In a specific example, the provider computing system 104 may perform the method 200 (e.g., receive a rule, receive a first web form template, receive a second web form template, store the rule, store the web form templates), then perform the method 300 (e.g., receive a source file, determine case data based on the source file, generate a case dataset, etc.) and then perform the method 400. Method 300 can be carried out by the system of FIG. 1. More particularly, the method 300 can be carried out by the processing circuit 128 of the provider computing system 104 and through communication with the partner computing systems 108 and the client computing devices 112.

Method 300 commences at step 304 at which the provider computing system 104 receives a source file including adverse event data. The source file and the adverse event data may be associated with one or more adverse events. For instance, the source file may include adverse event information for each adverse event. Further, the source file may be received from one of the client computing devices 112 or one of the partner computing systems 108. In some embodiments, the source file may be an E2B (R2 or R3) XML file received via an AS2 Gateway communication from the one of the partner computing systems 108 or the client computing devices 112. In other embodiments, the source file may be received from one of the partner computing systems 108 via an application programming interface (API) of the provider computing system 104. In other embodiments, the source file may be at least one of a PDF file, an Excel file, a CSV file, an email, or other file types described herein. The adverse event data may identify or include medical product or substance data (e.g., a substance name, a medical product slang name or term, a medical product trade name, a NDC, a medical product identifier, a dosage, a country of origin, a strength, a lot number, a route of administration, etc.), study data (e.g., a study identifier), an adverse event term and code (e.g., a MedDRA term and code), reporter data (e.g., a reporter name, a reporter country, a reporter address or contact information (e.g., email, phone number, IP address, FTP address, etc.)), patient data (e.g., patient initials, patient address or contact information), a report type (e.g., spontaneous, from study, from marketed medical product, etc.), a seriousness of the adverse event, and the like.

Once the provider computing system 104 has received the source file, the method 300 proceeds to step 308 at which the provider computing system 104 determines or generates case data based on the source file. In some embodiments, the provider computing system 104 may determine the case data based at least partially on the adverse event data. For instance, the provider computing system 104 may transform or add each piece of adverse event data to a specific field or portion of the case data. In one example, an adverse event term of the adverse event data may be added to an adverse event field of the case data. In this regard, the case data may include at least a portion of the adverse event data of the source file. In another example, the provider computing system 104 may determine at least a portion of the case data by transforming adverse event data that is in an incorrect format into a correct format (e.g., "SE" to "Sweden"). In some embodiments, at step 308, the provider computing system 104 may further generate a priority of the case based on the adverse event data, a rank of the adverse events associated with the current case, a rank of the medical products, and the like.

Additionally, to determine case data at step 308, the provider computing system 104 may retrieve the medical product and/or study data of the medical product and/or study identified in the source file from a medical product repository (not shown) or study repository (not shown) and determine case data by matching the adverse event data with the medical product and/or study data. For example, the adverse event data of the source file may indicate that the patient consumed Y Milliliters of a medical product X on Mar. 23, 2000. The provider computing system 104 may then search the medical product repository (not shown) for medical product data pertaining to medical product X and return additional values and medical product data (e.g., dosage of medical product X, the chemical formula of medical product X, expected side effects of medical product X, a clinical study that medical product X is currently being studied in, a clinical study #, pertaining to medical product X, and the like) as previously provided by the user. This additional medical product data and study data may then be included in the case data. In another example, the adverse event information may indicate that the patient consumed medical products A, B, and C on Mar. 23, 2000. The provider computing system 104 may determine that the user has not provided any medical product data pertaining to medical products A and B but has provided medical product data pertaining to medical product C. Accordingly, the provider computing system 104 may retrieve the medical product data pertaining to medical product C as well as assign a ranking of one to the medical product C, while assigning a ranking of two or three to the medical products A and B. The ranking may then be used to list or sort the medical product data within the case dataset (i.e., a ranking of one appears higher than a ranking of two, and so on) and on any user interfaces.

Once the provider computing system 104 has determined the case data based on the source file, the method 300 proceeds to step 312 at which the provider computing system 104 generates a case dataset including the case data. In some embodiments, at step 312, the provider computing system 104 may generate a case data object (also referred to as a data record) associated with or including the case identifier of the case. In this regard, the case dataset may include a case data object which may be used as a vehicle or apparatus for the case dataset and storing the case data within the case repository 134 of the provider computing system 104. For instance, the provider computing system 104 may determine or generate the case data and then populate the case data object with the case data.

In some embodiments, before steps 308 or 312, the provider computing system 104 may search the case repository 134 for potential duplicate case datasets of the case dataset to be generated. For instance, the provider computing system 104 may search the case repository 134 for cases that include a similar or the same case identifier, medical product(s), adverse event(s), report date, reporter name, and the like. In response to returning one or more potential duplicate case datasets, the provider computing system 104 may provide the potential duplicate case datasets and the adverse event data of the source file (or the newly generated case data) for review and comparison. Then, in response to receiving an indication the case datasets are not duplicates, the provider computing system 104 may proceed to step 308 or 312.

Once the provider computing system has generated the case dataset, the method 300 proceeds to step 316 at which the provider computing system 104 modifies the state of the case dataset to a first or beginning stage. For instance, the provider computing system 104 may generate the case dataset and set a state of the case dataset to a beginning stage (e.g., "Entry" or "Data Entry"). In some embodiments, step 316 may be a part of steps 308 or 312. For instance, when generating the case data, the provider computing system 104 may generate a state of the case dataset and set the state to the beginning stage. In another example, when generating the case dataset, the provider computing system 104 may generate a state of the case dataset and set the state to the beginning stage.

In some embodiments, after step 316, the provider computing system 104 may receive a request to advance or modify the state of the case. For instance, the provider computing system 104 may receive a request to advance or modify the state of the case dataset from the beginning stage to a second stage (e.g., "Review" or "QC Review"). In some embodiments, the request may be received from one of the client computing devices 112. In response, the provider computing system may generate and store a record of the request to modify the state of the case dataset including the user who requested the modification, the date, the time, and the like. In some embodiments, the record may be added to the case dataset for inclusion therein. Once the provider computing system 104 has generated the record, the provider computing system 104 may modify the state of the case from the beginning stage to the second stage. In some embodiments, after step 316 and in response to modifying the state of the case dataset from the beginning stage to the second stage, the provider computing system 104 may lock the case dataset such that the case dataset (and the case data thereof) may not be modified. For instance, the provider computing system 104 may receive a request to modify the locked case dataset (e.g., from one of the client computing devices 112), and deny the request by not modifying the case dataset. In one example, the provider computing system 104 may generate a notification indicating the case dataset is locked and cannot be modified and provide the notification to the client computing device 112 which requested to modify the case dataset.

In some embodiments, based on the generated case data (e.g., for a case that includes a seriousness of non-serious and an expectedness of expected) and/or a received request to output the case dataset, the provider computing system 104 may output the case dataset including at least a portion of the case data and set the state or status of the case dataset to a specific stage (e.g., the "complete" or "submitted" stage). For instance, the provider computing system 104 may output the case dataset as an E2B (R2 or R3) XML file to one or more of the partner computing systems 108 via an AS2 Gateway communication. In some embodiments, after step 320, the provider computing system 104 may select the newly generated case dataset and provide it to one of the client computing devices 112. Then, in response to receiving a verification of the case dataset, the provider computing system 104 may output the case dataset to one of the partner computing systems 108 and change the state or status of the case dataset to complete.

Once the provider computing system 104 has modified the state of the case dataset to a first stage, the method 300 proceeds to step 320 at which the provider computing system 104 stores the case dataset (e.g., as a case data object) in the case repository 134. For instance, the provider computing system 104 may add or provide the case dataset to the case repository 134 for storage therein.

Figure 4A:
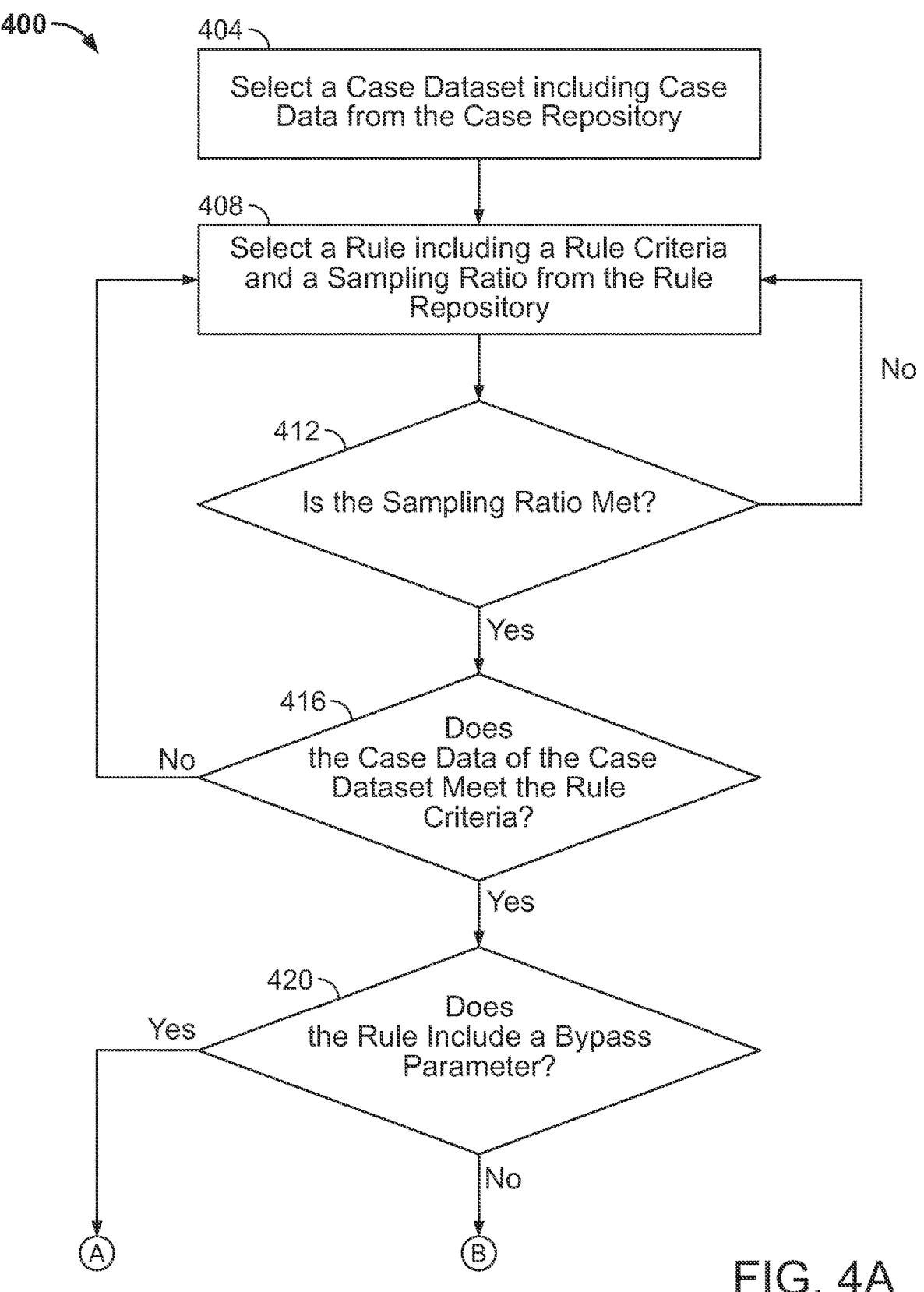
FIGS. 4A-4B may be a flow diagram of a method for modifying a state of the case dataset based on a rule, according to an example embodiment.
Figure 4B:
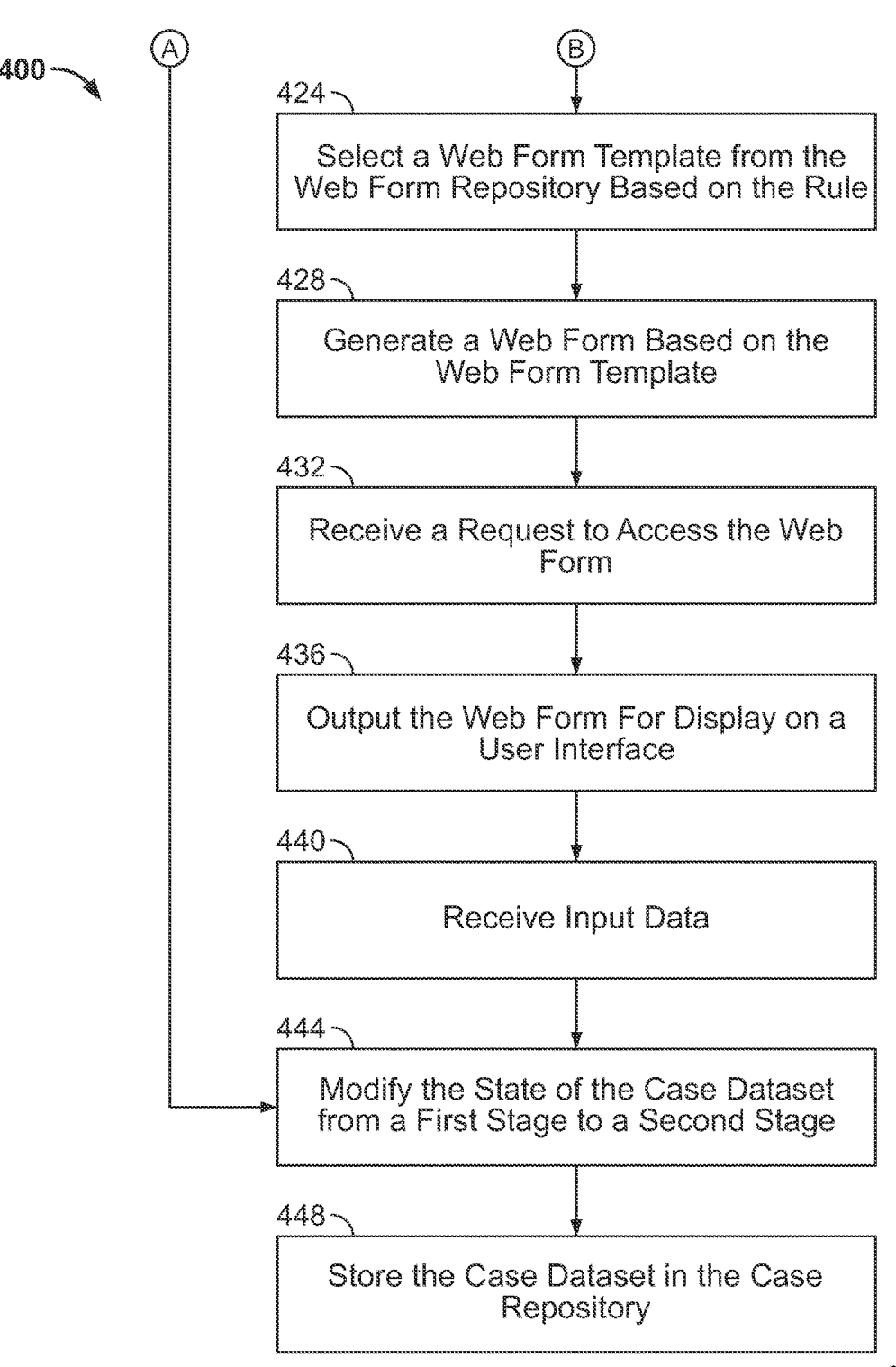

Referring now to FIGS. 4A-4B, a method 400 of modifying a state of a case dataset based on a rule is shown, according to an example embodiment. Method 400 can be carried out by the system of FIG. 1. More particularly, the method 400 can be carried out by the processing circuit 128 of the provider computing system 104 and through communication with the partner computing systems 108 and the client computing devices 112.

Method 400 commences at step 404 at which the provider computing system 104 selects a case dataset including case data from the case repository 134. In some embodiments, the provider computing system 104 may select the case dataset, in response to the case dataset meeting or fulfilling a rule trigger of one or more rules (e.g., the case dataset reaching a specific state or status (e.g., complete, approved, submitted, new, etc.)). In other embodiments, the provider computing system 104 may select the case dataset, in response to the case dataset being submitted to one of the partner computing systems 108. In some embodiments, the provider computing system 104 may select multiple case datasets at step 404.

Once the provider computing system 104 has selected the case dataset from the case repository 134, the method 400 proceeds to step 408 at which the provider computing system 104 selects a rule including a rule criteria and a sampling ratio from the rule repository 132. In some embodiments, the provider computing system 104 selects the rule from the rule repository 132, in response to the rule trigger being fulfilled. For instance, the provider computing system 104 may select a case dataset with a state in a first stage. Then, the provider computing system 104 may search or return each rule in which the rule trigger is fulfilled (e.g., includes a rule trigger of the first stage). In some embodiments, the provider computing system 104 may select the rules, from the rule repository 132, in the order of the rules. For instance, as described herein each rule may include an order or rank (e.g., rank or order 1, rank or order 2, rank or order 3, and so on). In this regard, the provider computing system 104 may first select the rule including the rank or order 1, and then proceed through the method 400 to step 412 at which the provider computing system 104 determines if the sampling ratio of the rule is fulfilled or met. If the sampling ratio is fulfilled, the method 400 may proceed to step 416 at which the provider computing system 104 determines if the case data of the case dataset fulfills the rule criteria. If the case data does not fulfill or meets the rule criteria, the method may proceed to step 408 and select a second rule from the rule repository 132. The second rule may have a rank or order of 2. This process may be repeated (e.g., the rule with order 3, the rule with order 4, and so on) until a match is found. If no rule including rule criteria that match or meet the case data is found, the method 400 may end.

Figure 5:
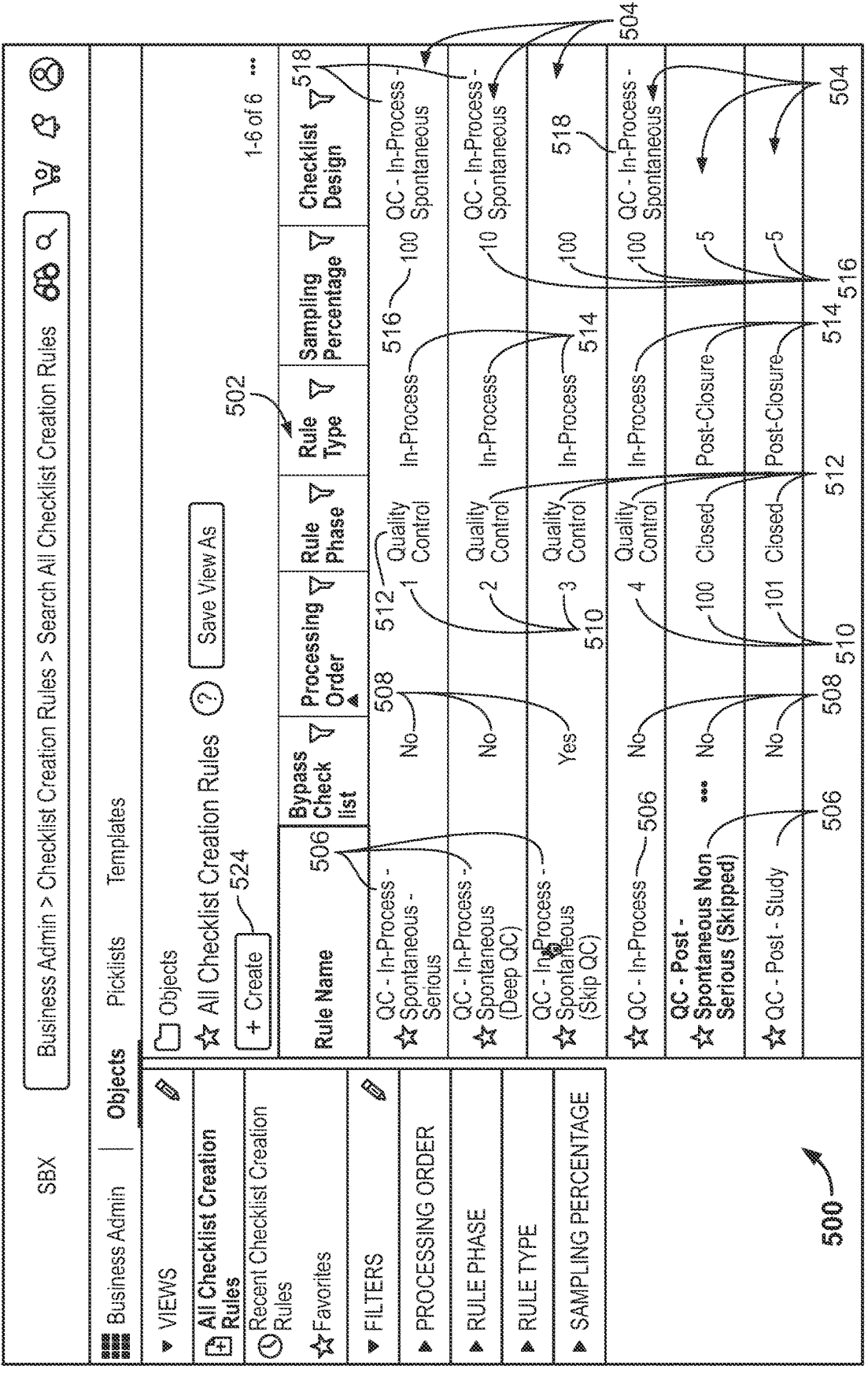
FIG. 5 may be an illustration of some aspects of a user interface generated by the case generation and processing system of FIG. 1 to manage one or more rules, according to an example embodiment.

Once the provider computing system 104 has selected the rule from the rule repository 132, the method proceeds to step 412 at which the provider computing system 104 determines if the sampling ratio of the rule is met or fulfilled. The sampling ratio may be the percentage or rate at which the rule is run (e.g., web forms are generated) versus not run (e.g., web forms are not generated, and the method proceeds back to step 408, where a new rule is selected). For instance, FIG. 5 shows six separate rules with sampling rates of 100, 10, 100, 100, 5, and 5. A rule with a sampling ratio of 100 is fulfilled or met 100% of the time. For example, a rule, with a sampling ratio of 100, will always proceed to step 416 (100% of the time). In comparison, a rule with a sampling ratio of 10 is fulfilled or met 1 out of every 10 times (e.g., 10% of the time). For example, a rule, with a sampling ratio of 10, will proceed to step 416 1 out of every 10 times. Likewise, a rule with a sampling ratio of 5 is fulfilled or met 1 out of every 20 times (e.g., 5% of the time). For example, a rule, with a sampling ratio of 5, will proceed to step 416 1 out of every 20 times. In this regard, to determine if the sampling ratio is met, the provider computing system 104 may record or store the number of times the sampling ratio has been fulfilled and the number of times the sampling ratio has not been fulfilled. Then, the provider computing system 104 may determine if the sampling ratio is met based on the stored number of times the sampling ratio has been fulfilled and not been fulfilled.

In some embodiments, the provider computing system 104 may determine if the sampling ratio is fulfilled by generating random odds or numbers, at step 412, which have the same odds as the sampling ratio (e.g., 5%, 10%, 100%, etc.). For instance, the provider computing system 104 may select a random number, with the same number of chances as the sampling ratio (e.g., 5% equals 20 random numbers, 10% equals 10 random numbers, 50% equals 2 random numbers, and so on). Then, if the random number is a specific value (e.g., "1"), the provider computing system 104 may determine the sampling ratio is fulfilled. In comparison, if the random number is not the specific value, the provider computing system 104 may determine the sampling ratio is not fulfilled. In this regard, over a large enough statistical sample (e.g., tens of thousands of random numbers), the sampling ratio will be met.

If, at step 412, the provider computing system 104 determines the sampling ratio is met, the provider computing system 104 may proceed to step 416 at which the provider computing system 104 may determine if the case data of the case dataset matches the rule criteria of the rule. To determine, if the case data meets or fulfills the rule criteria, the provider computing system 104 may determine if the fields or pieces of case data identified in the rule criteria are the same as specified in the rule criteria. For instance, the rule criteria may include a specific medical product (e.g., as identified by NDC), a specific adverse event (as identified by MedDRA term and code), and a specific seriousness (e.g., results in death). Accordingly, in response to each of the rule criteria matching or being the same as the respective pieces of case data (e.g., the medical product data of the case data includes the same NDC as the rule criteria, the adverse event of the case data includes the same MedDRA code as the case criteria, and the seriousness of the case data is the same as the seriousness of the rule criteria), the provider computing system 104 may determine the rule criteria is met or matched by the case data. In other embodiments, provider computing system 104 may determine the rule criteria is met, in response to a single rule criteria matching the case data of the case dataset (e.g., the medical product data of the case data includes the same NDC as the rule criteria, but the adverse event of the case data and the seriousness of the case data are different than the rule criteria). Further, the rule may include a separate action or web form template for each specific combination of rule criteria being met (e.g., a first web form template if a first rule criteria is met, a second web form template if a second rule criteria is met, and so on).

If, at step 416, the provider computing system 104 determines the case data of the case dataset does not meet the rule criteria, the method 400 may proceed back to step 408 where a different rule is selected from the rule repository 132. In comparison, if, at step 416, the provider computing system 104 determines the case data of the case dataset meets the rule criteria, the method 400 may proceed to step 420 where the provider computing system 104 determines if the rule includes a bypass parameter. The bypass parameter may be a parameter which indicates the provider computing system 104 is to bypass the generation of the web form. For instance, in response to the rule including a bypass parameter, the provider computing system 104 and the method 400 may proceed to step 444, as will be described further herein. In comparison, in response to the rule not including a bypass parameter, the provider computing system 104 and the method 400 may proceed to step 424. In some embodiments, a rule which includes a bypass parameter does not include or is not associated with a web form template because the bypass parameter indicates generation of a web form is to be bypassed or skipped.

At step 424, the provider computing system 104 may select a web form template from the web form repository 136 based on the rule. As described herein and shown in FIG. 5, each rule may be associated with or digitally connected (e.g., including a link or uniform resource locator (URL) to, including a reference pointer to, etc.) to one or more web form templates. Accordingly, at step 424, the provider computing system 104 may select the associated web form template from the web form repository 136. If the rule is linked to multiple web form templates, the provider computing system 104 may select each from the web form repository 136, at step 424.

Once the provider computing system 104 has selected the web form template from the web form repository 136, the method 400 proceeds to step 428 at which the provider computing system 104 generates a web form based on the web form template. For instance, the provider computing system 104 may generate the web form defined by the web form template. In some embodiments, the provider computing system 104 may generate the web form based on the web form template and the case dataset. For instance, the provider computing system 104 may generate the web form defined by the web form template and populate it with case data of the case dataset (as may be indicated or defined in the web form template). For instance, the web form may include a "adverse event" text question. Accordingly, the provider computing system 104 may populate the "adverse event" text section with the adverse event of the case data (e.g., "Was the adverse event 'Arm Pain' coded correctly from the source document?"), because the case dataset already includes the adverse event. In another example, the web form may include an "adverse event" text question. In another example, the web form may include an "medical product" text question. Accordingly, the provider computing system 104 may populate the "medical product" text section with the medical product data reported in the case data (e.g., "Drug X-300 mL subcutaneously on Jan. 1, 2024, at approx. 3 PM," etc.). In this regard, the web form template may define the case data that is to be included or populated in the specific text sections of the web form. Then, when generating the web form, the provider computing system 104 may populate the web form with the case data based on the case dataset and the web form template.

Figure 9:
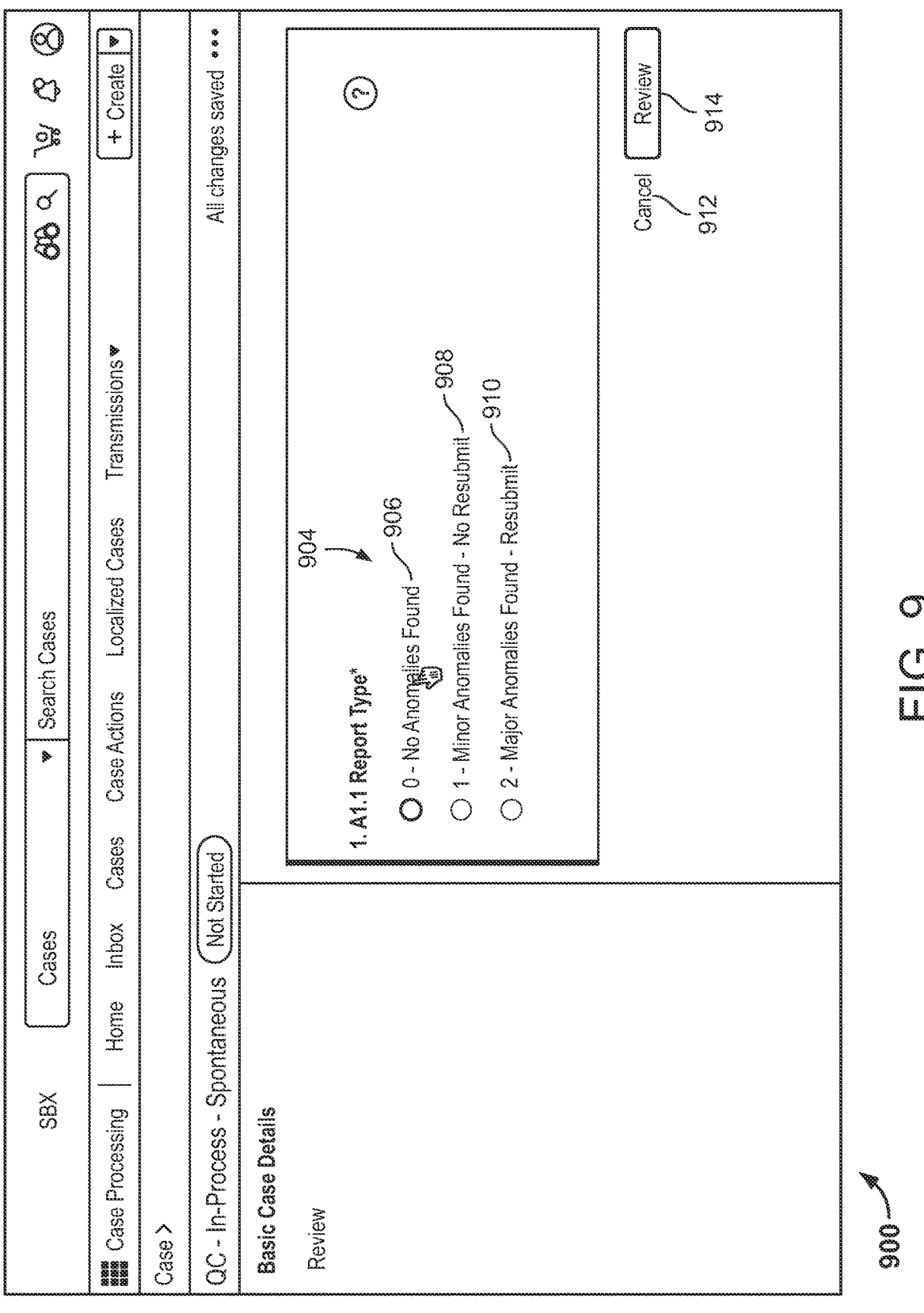
FIG. 9 may be an illustrations of some aspects of a user interface generated by the case generation and processing system of FIG. 1 to display a web form and receive input data via the web form, according to an example embodiment.

The web form or web page may include a digital file including at least one of a Word file (DOC), an Excel file (XLS), a Comma-separated value (CSV) file, an XML file, a PDF file, a hypertext markup language (HTML) file, a Cascading Style Sheet (CSS) file, a TIFF file, a text (TXT) file, or other files described herein and may include a digital QA checklist which is designed to gather information on if the case was intaken correctly. For instance, a patient may experience a SAR while taking a medical product in a clinical trial, which may be reported in a source file. The provider computing system 104 may generate a case dataset including case data based on the source file, and the state of the case dataset may be modified to a QC stage (e.g., "Review," "QC Review," etc.). Then, the provider computing system 104 may generate the web form, which is a QC checklist, including multiple text sections to perform a QC review and determine if the case data was intaken and entered correctly. In one specific example, the web form may include an HTML file which defines the boundaries of the web form, a CSS file which defines the layout, spacing, and positioning of elements (e.g., text sections) of the web form, and multiple records or pieces of data (e.g., case data, text data, etc.) which define the questions and certain prepopulated answers of the web form. An example web form is shown in FIG. 9.

Additionally, as described herein, the provider computing system 104 may generate the web form based on the web form template and the language of the user performing the QC review. For instance, before or at step 428, the provider computing system 104 may assign the QC review to a specific user of a client computing device 112. The user may be associated with a specific user account, and/or case access group. The user account may have a specific language selected, which is the primary language of the QC reviewer. Accordingly, the web form may be generated based on the web form template and the language of the user account. In some embodiments, the provider computing system 104 may generate the web form based on the web form template and the country of origin of the case dataset. For instance, the case may have originated or been initially reported in France and include text data in French. Accordingly, the provider computing system 104 may generate the web form based on the web form template and the language of the case dataset. Then, when assigning the web form to a specific user account, the provider computing system 104 may assign the web form to a user who is fluent in the specific language (e.g., French).

Accordingly, each web form template may be multilingual and include multiple text sections, each text section including text data in a specific languages. For instance, a web form template may include a first text section including text data in a first language (e.g., English), a second text section including text data with the same meaning as the first text section (e.g., the same questions) but in a second language (e.g., Mandarin Chinese), a third text section including text data with the same meaning as the first text section (e.g., the same questions) but in a third language (e.g., French). Then, based on the case dataset originating in France, the provider computing system 104 may generate the web form to include the third text section of the web form template.

In some embodiments, at step 428, the provider computing system 104 may generate one or more files associated with the web form. For instance, the provider computing system 104 may generate an HTML file which defines the boundaries of the web form, a CSS file which defines the layout, spacing, and positioning of elements (e.g., text sections) of the web form, and/or the records or data to be included in the web form (e.g., the text sections of the web form, the text data or questions of the text sections, etc.).

In some embodiments, at or after step 428, the provider computing system 104 may assign the web form to a user account based on the web form template and/or a rule type of the rule. For instance, in response to the rule including a rule type of "In-Process," the provider computing system 104 may select a specific user account (e.g., from an account repository, not shown) and assign the web form to the user account to be completed. In comparison, in response to the rule including a rule type of "Post-Closure," the provider computing system 104 may not assign the generated web form to a user account, and may wait until receiving a request to assign the web form to a specific user account to assign the web form to a specific user account.

In some embodiments, when generating the web form, the provider computing system 104 may translate the text data of the web form template from a first language to a second language, based on the web form template and the specific language of the assigned user or the country of origin of the case dataset. For instance, the web form template may include multiple text sections including text data in a first language (e.g., English). Further, the provider computing system 104 may determine the country of origin of the case dataset is a country which speaks a second language (e.g., Japanese) based on the case data of the case dataset.

Accordingly, the provider computing system 104 may translate the text data of the multiple text sections into a second language. The provider computing system 104 may then generate the web form to include each of the sections of the web form template. Each section including the text data in the second language. In another example, the provider computing system 104 may determine the language of the assigned user is a second language. For instance, an account repository (not shown) may include a primary language of the user. Accordingly, the provider computing system 104 may determine the language of the user and translate the text data of the multiple text sections into a second language and then generate the web form to include each of the sections of the web form template. Each section including the text data in the second language.

In other embodiments, the rule selected at step 408 may be associated with multiple web form templates (e.g., a first web form template including text data in a first language (e.g., English) and a second web form template including text data in a second language (e.g., French), as described herein). Accordingly, at step 416, the provider computing system 104 may select each of the web form templates and determine or select one of the web form templates, based on the country of origin of the case dataset. For instance, in response to the case dataset originating in an English-speaking country, the provider computing system 104 may select the first web form template. The web form may then be generated based on the selected web form template.

By providing for linguistically-selective generation of the web form, the present systems and methods provide for an improvement to case dataset processing systems. For instance, in typical case dataset follow-up generation, a web form may be generated in a single language (e.g., English) which is then provided to QC reviewers who speak different languages thereby resulting in low conversion rates, and less accurate responses. In comparison, because the web form is generated to include text data in the language of the recipient (e.g., the QC reviewer), the present systems and methods provide for improved engagement and more accurate QC reviews. For instance, because the web form is generated to include text data in the language of the recipient, the present systems and methods tailor the file's language to the recipient resulting in the recipient being more likely to understand and engage with the web form, leading to better user experience and higher conversion or response rates, as well as requiring less processing power to follow-up on the web form multiple times. Likewise, because the web form is generated to include text data in the language of the recipient, the present systems and methods result in more accurate responses (e.g., input data). For instance, by knowing and utilizing the language the recipient prefers, the present systems and methods provide for tailored questions and better context. This provides for improved and more accurate responses that are more aligned with the intended meaning of the QC review.

In some embodiments, before step 428, the provider computing system 104 may receive a request to modify or add on to the web form from one of the client computing devices 112. The request may include a specific text section or question to be included in the web form. For instance, in response to the ad-hoc question option or preference of the web form template being set to "yes" or "on," the request may include a specific ad-hoc question which is to be added to one of the text sections of the web form. In another example, in response to the ad-hoc section option or preference being set to "yes" or "on," the request may include a specific ad-hoc text section including multiple questions or text data which is to be added to the web form. Then, at step 428, the provider computing system 104 may generate the web form based on the web form template and the request received from the client computing device 112. For instance, the web form template may include three specific text sections, each including two questions, while the request may include an additional text section including three questions. Accordingly, at step 428, the provider computing system 104 may generate the web form to include the three text sections of the web form template and the text section of the request received from the client computing device 112.

By prepopulating the web form with case data and allowing for customizable questions, the present systems and methods provide for an improvement to case dataset follow-up web form generation and case dataset processing systems. For instance, because the present systems and methods utilize prefilled or prepopulated questions, where the answer is already known, the present systems and methods provides for improved efficiency and data collection through dynamic content generation and reduced data entry errors. For instance, the present systems and methods provide for a tailored experience that adapts to previously received data, thereby only asking relevant follow-up questions keeping the user engaged and more likely to respond to the other questions of the web form, which results in higher response rates as well as a greater amount of follow-up case data. Likewise, by populating the web form with case data, the present systems and methods provide for reduced data entry errors. For example, prepopulating the web form with case data eliminates the risk of typos, inconsistencies, and missing data due to manual entry errors, thereby resulting in less time, memory, and processing power spent correcting or re-submitting forms, improving data quality and workflow efficiency.

In some embodiments, after generating the web form, the provider computing system 104 may store the web form in the web form repository 136. For instance, the provider computing system 104 may generate the web form based on at least one of: the web form template, the request received from one of the client computing devices 112, and the case dataset. Then, the provider computing system 104 may add the web form to the web form repository 136. In some embodiments, the web form and the web form template may be stored in separate repositories (e.g., the web form repository 136 and a web form template repository (not shown).)

Once the provider computing system 104 has generated the web form, the method 400 proceeds to step 432 at which the provider computing system 104 receives a request to access the web form. For instance, the request may be received from a client computing device 112, which is attempting to perform a QC review on the case dataset and modify the state of the case dataset from a first stage (e.g., QC-check) to a second stage (e.g., Submission, ready to be submitted, etc.). For instance, the request may be received from a client computing device 112, via a complete button 854 of a case page 800, as will be described further herein.

Once the provider computing system 104 has received the request to access the web form, the method 400 proceeds to step 436 at which the provider computing system 104 may provide or output the web form to the requesting client computing device 112 for display on a user interface thereon. For instance, the provider computing system 104 may provide the generated web form to the requesting client computing device 112 to enable display on a webpage of the user interface of the requesting client computing device 112. FIG. 9 show an example user interface including a web form page 900, as will be described further herein.

Once the provider computing system 104 has output the web form, the method 400 proceeds to step 440 at which the provider computing system 104 receives input data (also referred to as a submission or QC data). For instance, the provider computing system 104 may receive the input data from the requesting client computing device 112 in response to the user of the client computing device 112 providing one or more inputs or responses to the text sections of the user interface. The input data may indicate whether the case dataset was correctly intaken (e.g., "No Errors," "No Anomalies Found," etc.) or whether the case dataset was not correctly intaken and includes errors (e.g., "Minor Anomalies Found, No Resubmit," "Major Anomalies Found, Resubmit," etc.).

In some embodiments, the rule may include a scoring mechanism and an action or operation the provider computing system 104 is to include in response to a specific score. For instance, the rule may include a scoring mechanism with a first score of 0-1 and a second score of 2. Then, in response to the input data having a score that is 0-1, the rule may indicate the provider computing system 104 is to set a QC complete field of the case dataset to true and proceed to step 444 and modify the state of the case dataset. In comparison, in response to the input data having a score of 2, the rule may indicate the provider computing system 104 is to not proceed to step 444, and the method 400 should end. In such a step, the state of the case dataset may not be modified. The input data may receive a score from the score assigned to each of multiple options. For instance, as shown in FIG. 9, the first two options include a score of "0" and "1", whereas the last option includes a score of "2". In other embodiments, each answer or option of the web form is associated with a specific action. In this regard, in response to the input data having a selected first or second options, the rule may indicate the provider computing system 104 is to proceed to step 444 and modify the state of the case dataset. In comparison, in response to the input data having a selected third option, the rule may indicate the provider computing system 104 is to not proceed to step 444, and the method 400 should end.

Once the provider computing system 104 has received the follow-up case data, the method 400 proceeds to step 444 at which the provider computing system 104 modifies the state of the case dataset from a first stage (e.g., Review) to a second stage (e.g., submission). In some embodiments, the provider computing system 104 may proceed to step 444, in response to the input data including a specific score or selectable option (e.g., a score of 0 or 1, a score of less than 2, etc.). Likewise, if the rule includes a bypass parameter at step 420, the provider computing system 104 may bypass steps 424-440 and proceed directly to step 444, where the state of the case dataset is modified. In some embodiments, in response to the rule including a bypass parameter, the provider computing system 104 may mark or modify the case dataset to indicate that a QC-check was skipped for the case dataset. For instance, the case data may include a QC-check skipped field, and, in response to the rule including a bypass parameter at step 420, the provider computing system 104 may bypass steps 424-440 and proceed directly to step 444, where the state of the case dataset is modified and the QC-check skipped field is set to "Yes." Then, when generating a post-closure QC-check, the provider computing system 104 may select case datasets in which the original QC-check was skipped (e.g., the QC-check skipped field is set to "Yes."

In some embodiments, prior to step 444, the provider computing system 104 may receive a request to modify the state of the case dataset from the first stage to the second stage. Then, the provider computing system 104 may determine if the case dataset is complete and prepared to be modified. For instance, the case dataset may include a QC review complete field. Then, in response to the QC review complete field being "yes" or "True," the provider computing system 104 may determine the case dataset is prepared to be modified and modify the state of the case dataset. For instance, in response to the rule including a bypass parameter, the provider computing system 104 may set the QC review complete field to True. In another example, in response to the input data including a specific score (e.g., 0 or 1), the provider computing system 104 may set the QC review complete field to True. In comparison, if the input data includes a second specific score (e.g., 2), the provider computing system 104 may not set the QC review complete field to True and it may be left at the default (e.g., Fault).

Through the rules including bypass parameters, sampling ratio, and rule criteria, the present systems and methods provide for more efficient and precise quality-control checks, thereby providing for improved case dataset intake and processing. For example, in typical case dataset intake and processing systems, quality control checks are required for each and every single case dataset, which results in low case throughput and a less efficient workflow. This is especially true for cases including non-serious expected adverse events, which are large in volume and not as high-priority to report to health authorities (as compared to serious adverse events). In comparison, the present systems and methods utilize a bypass parameter, sampling rate, and rule criteria such that the highest priority case datasets (e.g., serious adverse events) receive a QC check or review, as set via the rule criteria and sampling ratio. while the lower priority case datasets receive a QC check or review at a specific sampling ratio or rate, and are bypassed the other portion of the time, as set via the rule criteria, sampling ratio, and bypass parameter. By utilizing the rules, the present systems and methods reduce QC review time, and require less processing power and memory by requiring less QC reviews overall. This also results in faster case dataset processing time leading to higher output of case datasets and faster reporting of case datasets to the relevant health authorities.

In one example, the present systems and methods may receive a first rule, for low-priority case datasets (e.g., non-serious and expected adverse events), which includes a sampling ratio of 10 and an associated web form for QC review, as well as a rank of "1". Then, the present systems and methods may receive a second rule, for low-priority case dataset, (e.g., non-serious and expected adverse events), which includes a sampling ratio of 100 and a bypass parameter, as well as a rank of "2". In this regard, for every ten low-priority case datasets that are received, the present systems and methods may generate a single web form for QC review, and the other nine may be automatically promoted or modified from a first state to a second state, thereby bypassing nine separate QC reviews, thereby requiring nine less QC reviews and less memory for storing the QC data and processing power to interface with the client computing device to complete the QC reviews. Each case dataset may then be marked as having bypassed QC review. Then, at a later time, to still ensure QC, the provider computing system 104 can perform post-submission QC reviews on the case datasets which bypassed QC review.

Once the provider computing system 104 has added the follow-up case data to the case dataset (and/or versioned the case dataset), the method 400 proceeds to step 448 at which the provider computing system 104 stores the case dataset in the case repository 134. In some embodiments, at or after step 448, the provider computing system 104 may output the case dataset including at least a portion of the case data and the follow-up case data to one of the partner computing systems 108. For instance, the provider computing system 104 may output the case dataset as an E2B (R2 or R3) XML file to one or more of the partner computing systems 108 via an AS2 Gateway communication. Then, in response to outputting the case dataset, the provider computing system 104 may modify the state of the case dataset from the second stage (e.g., Submission) to a third or last stage (e.g., Completed).

Referring now to FIGS. 5-9, user interfaces shown and displayed to the user of the one or more client computing devices 112 during the methods 200, 300, and/or 400 are shown, according to example embodiments. As described herein, the user interfaces of FIGS. 5-9 may be one or more of web interfaces generated by the provider computing system 104 and rendered by each of the client computing devices 112 as part of a web application or graphical user interfaces downloaded and generated by each of the client computing devices 112 as part of a software application (e.g., a mobile application, etc.). Further, the user interfaces shown on FIGS. 5-9 allow for communication between the user) and the provider computing system 104 via the respective client computing device 112 (specifically via the I/O circuit 180). Through interaction with the various user interfaces, the user may provide user input, feedback, and other data requested by the provider computing system 104. In this regard, it should be understood that each interaction described herein by the user with the user interfaces of FIGS. 5-9 may be provided to one or more of the client computing devices 112 and then transmitted to the provider computing system 104 and that each action described herein as occurring to the respective client computing device 112 (e.g., navigating to a certain page, generating a popup, etc.) may be performed by the provider computing system 104.

Referring now to FIG. 5, a rule management page 500 which can be displayed on a display the I/O circuit 180 of the client computing devices 112, is shown. In general, the rule management page 500 provides the user an interface to setup, modify, and manage rules for a specific customer. As shown, the rule management page 500 includes a rule listing or section 502 including multiple rule representations 504 and a create button 524. To render or generate the rule management page 500 on the client computing device 112, the provider computing system 104 may provide the rules, of the rule repository 132, and associated data to the client computing device 112. In this regard, it should be understood that each of the sections, fields, or buttons of the rule management page 500 may be or included in the rules described herein.

The rule listing 502 provides the user of the respective client computing device 112 with an interface to set, manage, and update the rules of the rule management page 500. As shown, the rule listing 502 includes the rule representations 504 and the create button 524. The create button 524 is a selectable button that, when selected, causes the client computing device 112 to generate and provide a request to the provider computing system 104 to generate a new empty or blank rule. The rule may be represented by a new rule representation 504 in the rule listing 502. In some embodiments, in response to selecting the create button 524, a popup page or section (not shown) may be generated and displayed on the rule management page 500. The popup page may receive rule data including a type, a name of the rule, a number of days between attempts, a total number of attempts, an order, and the like. The client computing device 112 may then generate and provide a request to the provider computing system 104 to generate a rule including the rule data described above. The request may include the rule data of the popup page.

The rule representations 504 may each represent a specific rule and include the rule data or fields which they represent. For instance, each rule representation 504 is shown to include a name field 506, a bypass parameter field 508, an order or rank field 510, a rule trigger field 512, a rule type field 514, a sampling ratio field 516, and an associated web form template field 518. number of days between attempts field 510, and a total number of attempts to make field 512. The name field 506 may be a field through which the user of the respective client computing device 112 can review, edit, and/or initially set the name of the rule associated with the rule representation 506 which may then be sent by the respective client computing device 112 to the provider computing system 104 for storage (e.g., in the rule repository 132). Further, the name field 506 may be a selectable button or link that, when selected, causes the client computing device 112 to navigate to a rule page 600 for the rule of the rule representation 504.

Similarly, the bypass parameter field 508 may a field through which the user of the respective client computing device 112 can review, edit, and/or initially set a bypass parameter (e.g., "on" or "off," "Yes" or "No," etc.) of the rule associated with the rule representation 506 which may then be sent by the respective client computing device 112 to the provider computing system 104 for storage (e.g., in the rule repository 132). In some embodiments, when the bypass parameter field 508 is set to "On" or "yes", the provider computing system 104 may automatically set the web form template field 518 to be blank or empty, as shown.

The rank or order field 510 may be a field through which the user of the respective client computing device 112 can review, edit, and/or initially set the rank or order of the rule associated with the rule representation 506 which may then be sent by the respective client computing device 112 to the provider computing system 104 for storage (e.g., in the rule repository 132). In some embodiments, each rule representation 504 may include a different rank or order field 510, such that no two rule representations 504 include the same rank or order. For instance, a first rule representation 504 (e.g., the rule representation 504 the highest on the rule management page 500) may include a rank or order field 510 of "1". Then, a second rule representation 504 (e.g., the rule representation 504 directly below the first rule representation 504 on the rule management page 500) may include a rank or order field 510 of "2"). Then, the last rule representation 504 (e.g., the rule representation 504 the lowest on the rule management page 500) may include the highest number in the rank or order field 510 (e.g., 101, as shown).

The rule trigger or rule phase field 512 may be a field through which the user of the respective client computing device 112 can review, edit, and/or initially set the rule trigger of the rule associated with the rule representation 506 which may then be sent by the respective client computing device 112 to the provider computing system 104 for storage (e.g., in the rule repository 132). In some embodiments, as shown, the rule trigger field 512 may be a rule phase field 512 through which the user of the respective client computing device 112 can review, edit, and/or initially set the phase or stage the case dataset is to enter for the rule associated with the rule representation 506 to be triggered or checked for fulfillment which may then be sent by the respective client computing device 112 to the provider computing system 104 for storage (e.g., in the rule repository 132). Other rule triggers may include a specific timeframe (e.g., every day, every minute, etc.), a specific user type (e.g., Australian user), and the like.

The type field 514 may be a field through which the user of the respective client computing device 112 can review, edit, and/or initially set a type of the rule associated with the rule representation 506 which may then be sent by the respective client computing device 112 to the provider computing system 104 for storage (e.g., in the rule repository 132). As described herein, the type of the rule may be an option or preference which determines when the method 400 is to commence and the rule is to be checked for fulfillment. For instance, a rule with the type "In-Process" may be checked for fulfillment while a case dataset is "in-process" (e.g., while the case dataset is moving from stage to stage). In another example, a rule with the type "Post-Closure" may be checked for fulfillment while a case dataset is "Post-Closure" (e.g., after the case dataset has reached the "complete" stage or phase and has been submitted to a partner computing device 112). In some embodiments, "in-process" rules and the web forms generated in response to "in-process" rules may be automatically assigned to a specific user, whereas "post-closure" rules and the web forms generated in response to "post-closure" rules may not be automatically assigned to a specific user. In this regard, the "post-closure" rules and the web forms generated in response to "post-closure" rules may be assigned to a specific user, in response to receiving a request to do so (e.g., a request to assign the web form to user Jane Doe).

The sampling ratio field 516 may be a field through which the user of the respective client computing device 112 can review, edit, and/or initially set the sampling ratio of the rule associated with the rule representation 506 which may then be sent by the respective client computing device 112 to the provider computing system 104 for storage. For instance, as shown, the sampling ratio field 516 may include a value from 1 to 100 (inclusive), which may set the sampling ratio of the rule.

Likewise, the linked web form template field 518 may be a field through which the user of the respective client computing device 112 can review, edit, and/or initially set the linked web form template, which may be generated in response to the rule associated with the rule representation 506 being fulfilled. The linked web form may then be sent by the respective client computing device 112 to the provider computing system 104 for storage (e.g., in the rule repository 132). Further, the web form template field 518 may be a selectable button or link that, when selected, causes the client computing device 112 to navigate to a web form template page (not shown) for the web form template linked to the rule of the rule representation 504.

Figure 6A:
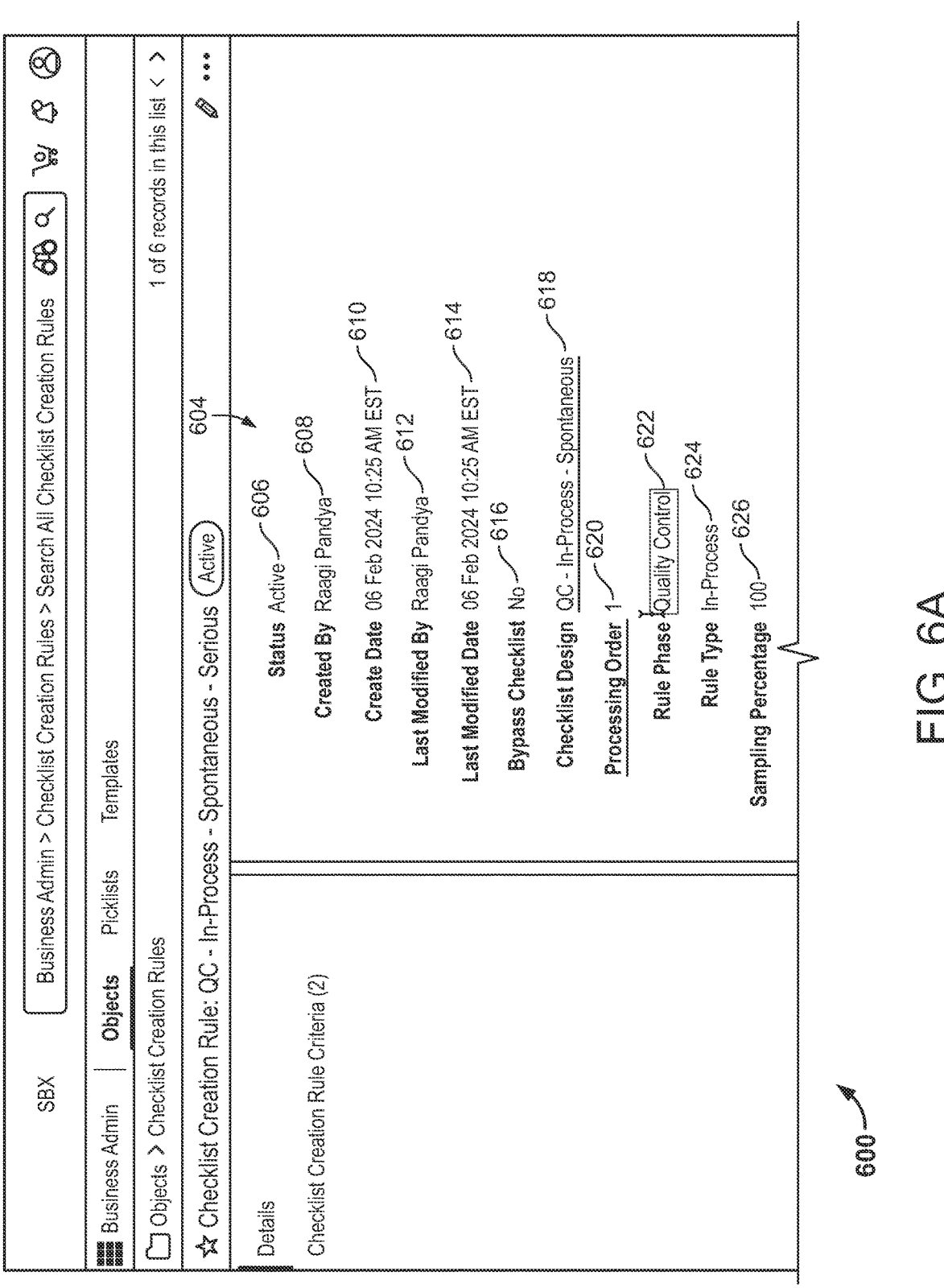
FIG. 6A-6B may be illustrations of some aspects of a user interface generated by the case generation and processing system of FIG. 1 to manage a specific rule, according to an example embodiment.
Figure 6B:
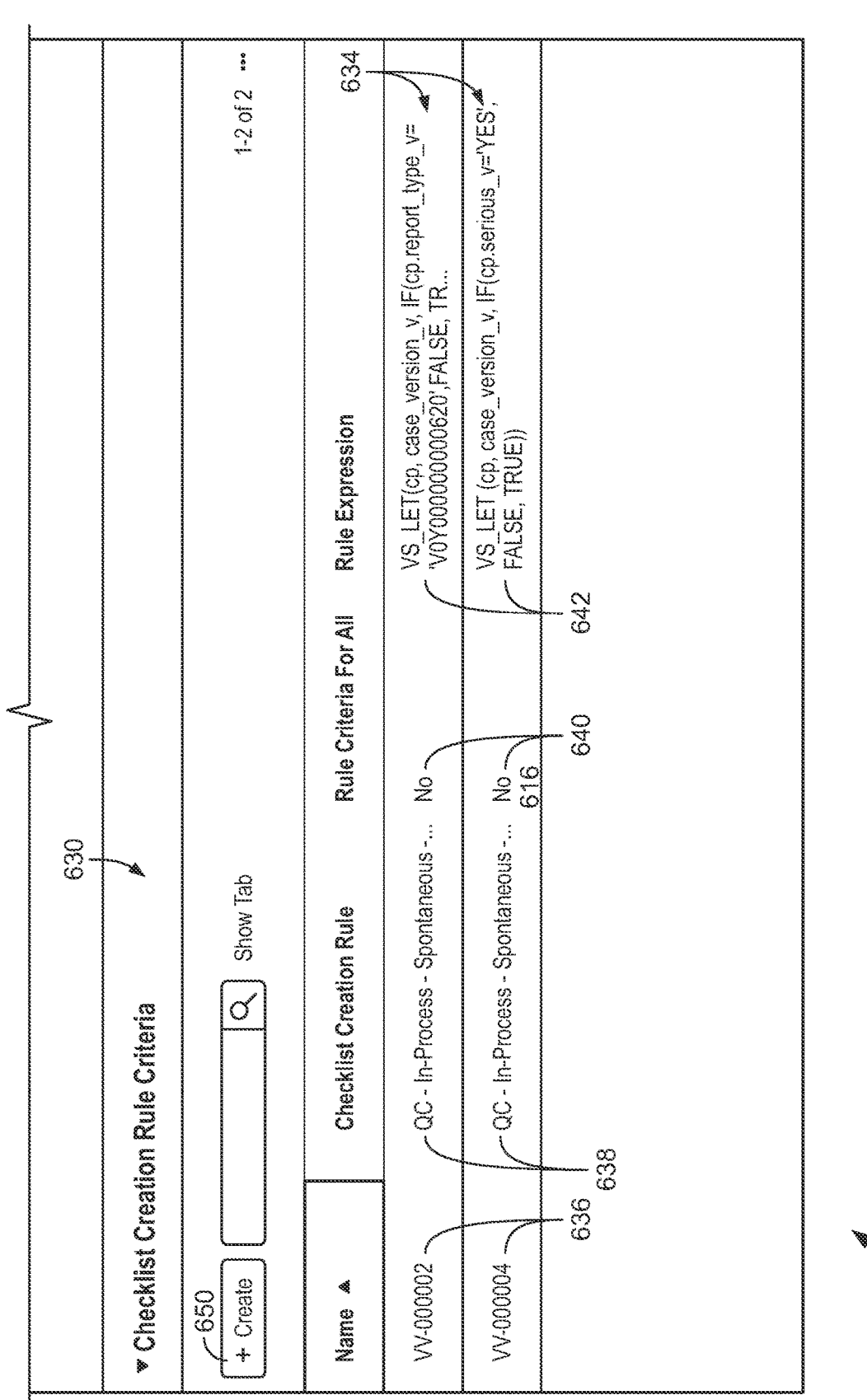

Referring now to FIGS. 6A-6B, a rule page 600 which can be displayed on a display the I/O circuit 180 of the client computing devices 112, is shown. In general, the rule page 600 provides the user an interface to modify and manage a specific rule of the multiple rules of the customer. To be navigated to the rule page 600, the user of the respective client computing device 112 may select the name field 506 of the rule representation 504. In response to the selection, the provider computing system 104 may receive an indication, from the respective client computing device 112, and generate the rule page 600 including the rule data of the selected rule. The provider computing system 104 may then provide the rule data and the rule page 600 to the respective client computing device 112 for display thereon. As shown, the rule page 600 includes a details or overview section 604 and a rule criteria section 630. To render or generate the rule page 600 on the client computing device 112, the provider computing system 104 may provide the specific rule and associated data to the client computing device 112.

The overview section 604 provides the user of the respective client computing device 112 with an interface to view and set an overview or general details of the rule of the rule page 600. As shown, the overview section 604 includes a status field 606, a created by field 608, a created date field 610, a last modified by field 612, a last modified date field 614, a bypass parameter field 616, a linked web form template field 618, a rank or order field 620, a rule trigger field 622, a rule type field 624, and a sampling ratio field 626.

The status field 606 may be a field through which the provider computing system 104 may set and indicate the status (e.g., active, inactive, etc.), of the rule of the rule page 600. For instance, a rule which has a status or state of inactive may not be selected by the provider computing system 104 at step 408, whereas a rule which has a status or state of active may be selected by the provider computing system 104 at step 408.

The created by field 608 and the last modified by field 612 may each be a field through which provider computing system 104 can set and indicate the user account which created the rule of the rule page 600 and last modified the rule of the rule page 600, respectfully. Similarly, the created date field 610 and the last modified date field 614 may each be a field through which provider computing system 104 can set and indicate the date and/or time the rule of the rule page 600 was created and the date/time the rule of the rule page 600 was last modified, respectfully.

The bypass parameter field 616 may be similar to the bypass parameter field 508 and may be a field through which the user of the respective client computing device 112 can review, edit, and/or initially set a bypass parameter (e.g., "on" or "off," "Yes" or "No," etc.) of the rule associated with the rule page 600 which may then be sent by the respective client computing device 112 to the provider computing system 104 for storage (e.g., in the rule repository 132). Likewise, the linked web form template field 618 may be similar to the linked web form template field 518 and may be a field through which the user of the respective client computing device 112 can review, edit, and/or initially set the linked web form template, which may be generated in response to the rule associated with the rule page 600 being fulfilled.

The rank or order field 620 may be similar to the rank field 510 and may be a field through which the user of the respective client computing device 112 can review, edit, and/or initially set the rank or order of the rule associated with the rule page 600 which may then be sent by the respective client computing device 112 to the provider computing system 104 for storage (e.g., in the rule repository 132).

The rule trigger field 62 may be similar to the rule trigger or rule phase field 512 and may be a field through which the user of the respective client computing device 112 can review, edit, and/or initially set the rule trigger of the rule associated with the rule page 600. Likewise, the rule type field 624 may be similar to the rule type field 514 and may be a field through which the user of the respective client computing device 112 can review, edit, and/or initially set the rule type of the rule associated with the rule page 600. Similarly, the sampling ratio field 626 may be similar to the sampling ratio field 516 and may be a field through which the user of the respective client computing device 112 can review, edit, and/or initially set the sampling ratio of the rule associated with the rule page 600.

The rule criteria section or listing 630 provides the user an interface to initially set and manage the rule criteria of the rule of the rule page 600. As shown, the rule criteria section 620 includes one or more rule criteria representations 634 and a create button 650. The create button 650 is a selectable button that, when selected, causes the client computing device 112 to generate and provide a request to the provider computing system 104 to generate a new rule criteria of the rule. The rule criteria may be represented by a new rule criteria representation 634 in the rule criteria section 630. In some embodiments, in response to selecting the create button 650, a popup page or section (not shown) may be generated and displayed on the rule page 600. The popup page may receive rule criteria fields including a case object name, a field name, a field value, and the like. The client computing device 112 may then generate and provide a request to the provider computing system 104 to generate the rule criteria including the rule criteria data or fields described above.

Each rule criteria representation 634 may represent a specific rule criteria of the rule of the rule page 600. In this regard, the rule criteria representation 634 may include rule criteria data or fields of the rule criteria. As shown, each rule criteria representation 634 includes a name field 636, a rule field 638, a rule criteria for all field 640, and a rule expression field 642. The name field 636 may be a field through which the user of the respective client computing device 112 can review, edit, and/or initially set the name of the rule criteria associated with the rule criteria representation 634 which may then be sent by the respective client computing device 112 to the provider computing system 104 for storage (e.g., in the rule repository 132). Further, the name field 636 may be a selectable button or link that, when selected, causes the client computing device 112 to navigate to a rule criteria page (not shown) for the rule criteria of the rule criteria representation 634. Likewise, the rule field 638 may be a field through which the user of the respective client computing device 112 can review and view the parent rule of which the rule criteria of the rule criteria representation 634 is used to determine fulfillment.

The rule criteria for all field 640 may be a field through which the user of the respective client computing device 112 can review, edit, and/or initially set a rule criteria for all parameter or preference (e.g., "Yes" or "No", "On" or "off", etc.) which may then be sent by the respective client computing device 112 to the provider computing system 104 for storage. In some embodiments, if the rule criteria for all field 640 is set to "On" or "Yes", the provider computing system 104 may not determine the rule is fulfilled unless the associated rule criteria of the rule criteria representation 634 is met or fulfilled (regardless of if other rule criteria are met or fulfilled). In comparison, if the rule criteria section 630 includes multiple rule criteria representations 634, each rule criteria representation 634 including a rule criteria for all field 640 set to "No", only a single rule criteria must be met matched for the rule to be considered met. In this regard, the rule criteria for all parameter may indicate whether the rule criteria required to be met for the rule criteria to be met.

The rule expression field 642 may be a field through which the user of the respective client computing device 112 can review, edit, and/or initially set the rule criteria through a text expression, which may then be sent by the respective client computing device 112 to the provider computing system 104 for storage. As shown, the expression field 642 may include a text expression which defines a logical expression that results in True or False (e.g., 0 or 1, "yes" or "no", etc.). Accordingly, the text expression may include a reference to case data fields (e.g., "report_type_v," "reported_adverse_event_v", "reported_medical_product_v", "serious_v", and the like), one or more logical comparator's (e.g., "==" for equal to, "<" for less than, ">" for greater than, "!=" for not equal to, "<=" for less than or equal to), and/or one or more functions (e.g., "IF( )" "IS( )", and the like). In this regard, the expression field 642 may define whether the rule criteria is fulfilled or is not fulfilled based on the case data. In this regard, the expression field 642 and the expression thereof may be "True" if the rule criteria is fulfilled and "False" if the rule criteria is not fulfilled. In one example, a rule criteria may include an expression field "VS_LET(cp, case_version v, IF(cp.serious_v='Yes', False, True) indicating the expression is true or 1 (and the rule criteria is met), in response to the seriousness of the case data serious field being serious (e.g., "serious-resulted in death", "serious: resulted in hospitalization", etc.).

Figure 7:
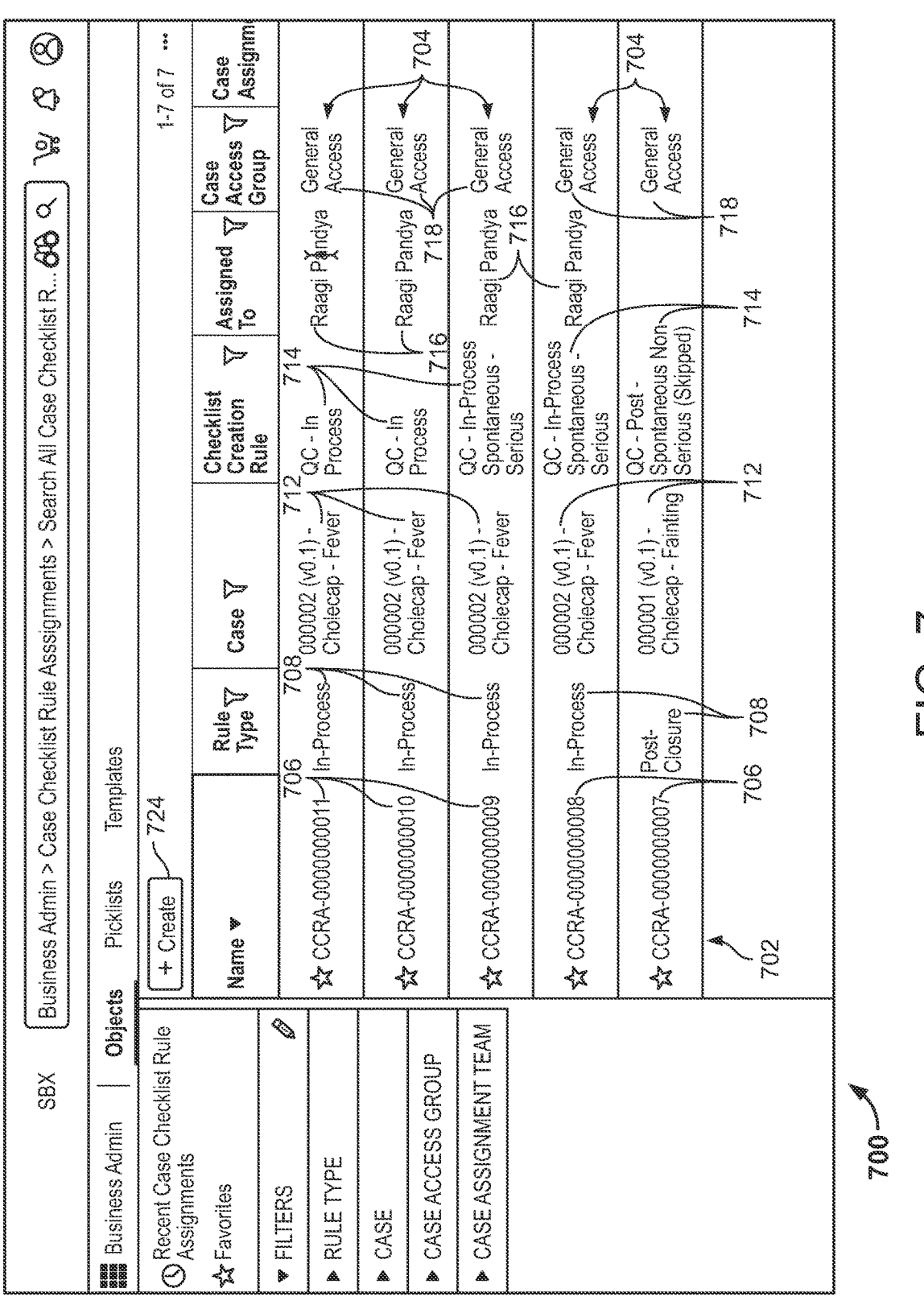
FIG. 7 may be an illustration of some aspects of a user interface generated by the case generation and processing system of FIG. 1 to manage web forms, according to an example embodiment.

Referring now to FIG. 7, a web form management page 700 which can be displayed on a display the I/O circuit 180 of the client computing devices 112, is shown. In general, the web form management page 700 provides the user an interface to setup, modify, and manage web forms for a specific customer. As shown, the web form management page 700 includes a web form listing or section 702 including multiple web form representations 704 and a create button 724. To render or generate the web form management page 700 on the client computing device 112, the provider computing system 104 may provide the web forms, of the web form repository 136, and associated data to the client computing device 112. In this regard, it should be understood that each of the sections, fields, or buttons of the web form management page 700 may be or included in the web forms described herein.

The web form listing 702 provides the user of the respective client computing device 112 with an interface to set, manage, and update the web forms of the web form management page 700. As shown, the web form listing 702 includes the web form representations 704 and the create button 724. The create button 724 is a selectable button that, when selected, causes the client computing device 112 to generate and provide a request to the provider computing system 104 to generate a new empty or blank web form. The rule may be represented by a new web form representation 704 in the web form listing 702. In some embodiments, in response to selecting the create button 724, a popup page or section (not shown) may be generated and displayed on the web form management page 700. The popup page may receive web form data including a web form template to use in generating the web form, a case dataset to use in generating the web form, and the like. The client computing device 112 may then generate and provide a request to the provider computing system 104 to generate a web form based on data received in the popup page.

The web form representations 704 may each represent a web form and include the web form data or fields which they represent. For instance, each web form representation 704 is shown to include a name field 706, a rule type field 708, a case dataset field 712, a rule field 714, an assigned user field 716, and a case access group field 718.

The name field 706 may be a field through which the user of the respective client computing device 112 can review, edit, and/or initially set the name of the web form associated with the web form representation 704 which may then be sent by the respective client computing device 112 to the provider computing system 104 for storage (e.g., in the rule repository 132). Further, the name field 706 may be a selectable button or link that, when selected, causes the client computing device 112 to navigate to the web form page 900 for the web form of the web form representation 704.

The rule type field 708 may be similar to the rule type field 514 and be a field through which the user of the respective client computing device 112 can review, edit, and/or initially set a type of the rule from which the web form of the web form representation 704 was generated. Further, as described herein, rules which include a rule type of "In-Process" may result in the automatic assignment of a user account to the web form generated in response to the rule, whereas rules which include a rule type of "Post-Closure" may not result in the automatic assignment of a user account to the web form generated in response to the rule (as shown). In this regard, the assigned user field 716 may be a field through which the user of the respective client computing device 112 can review, edit, and/or initially set an assigned user account of the web form of the web form representation 704. In this regard, for web forms generated from a rule with a rule type of "In-Process," the provider computing system 104 may automatically assign the user account and set the assigned user field 716 to the assigned user account. In comparison, for web forms generated from a rule with a rule type of "Post-Closure," the respective client computing device 112 may set the assigned user via the assigned user field 716.

The case field 712 may be a field through which the user of the respective client computing device 112 can review, edit, and/or initially set a case dataset for which the web form was generated. Further, the case dataset field 712 may be a selectable button or link that, when selected, causes the client computing device 112 to navigate to the case page 800 for the case dataset of the case dataset field 712. Likewise, the rule field 714 may be a field through which the user of the respective client computing device 112 can review, edit, and/or initially set a rule from which the web form was generated. Further, the rule field 714 may be a selectable button or link that, when selected, causes the client computing device 112 to navigate to the rule page 600 for the rule of the rule field 714.

The case access group field 718 may be a field through which the user of the respective client computing device 112 can review, edit, and/or initially set a case access group associated with the case dataset and the web form of the web form representation 704. In some embodiments, the case access group may include a list of user accounts to which the web form can be assigned. In this regard, the assigned user field 716 may include a user account which is selected from the case access group of the case access group field 718.

Figure 8A:
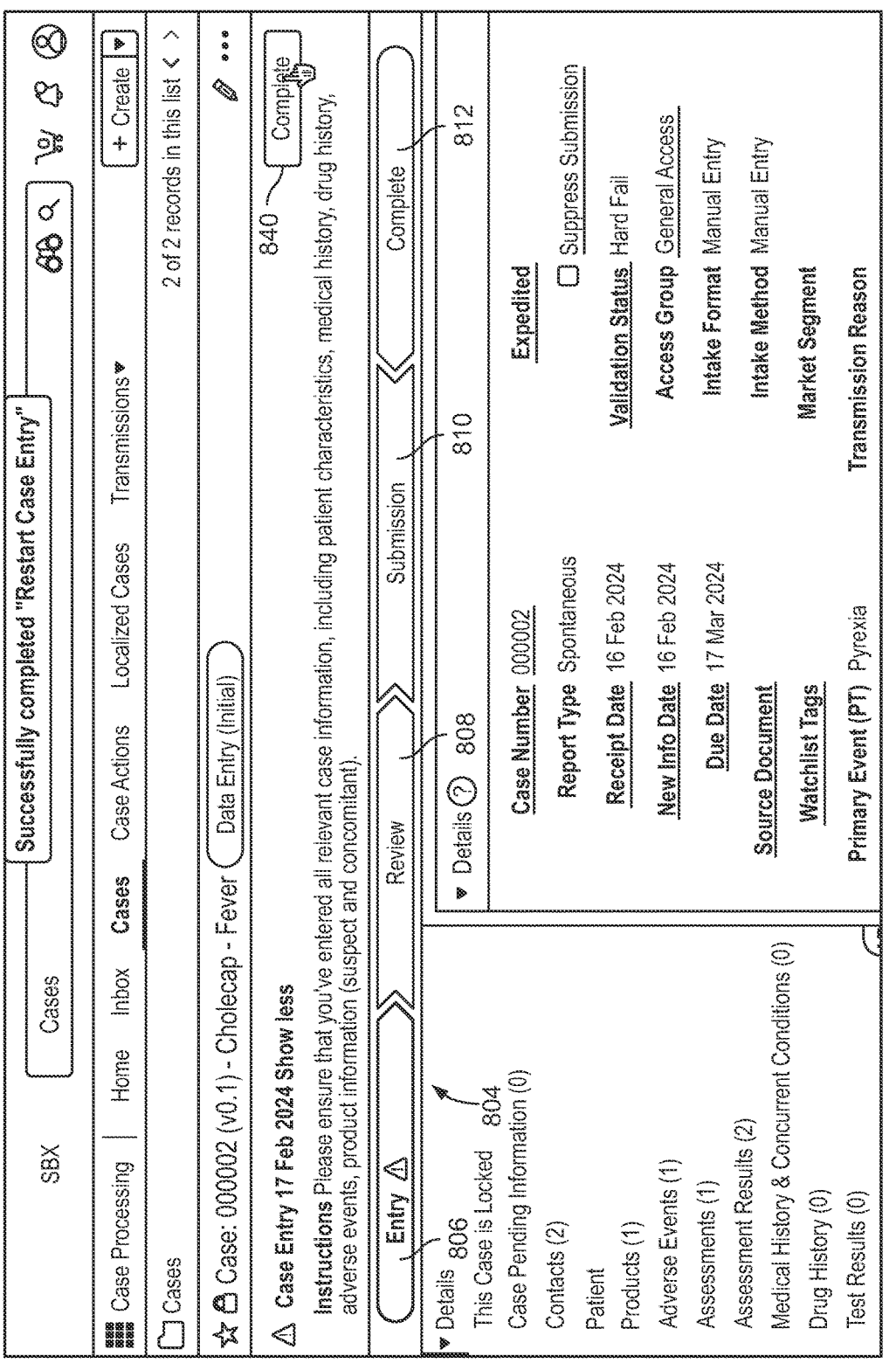
FIGS. 8A-8B may be illustrations of some aspects of a user interface generated by the case generation and processing system of FIG. 1 to manage and process a case dataset, according to an example embodiment.
Figure 8B:
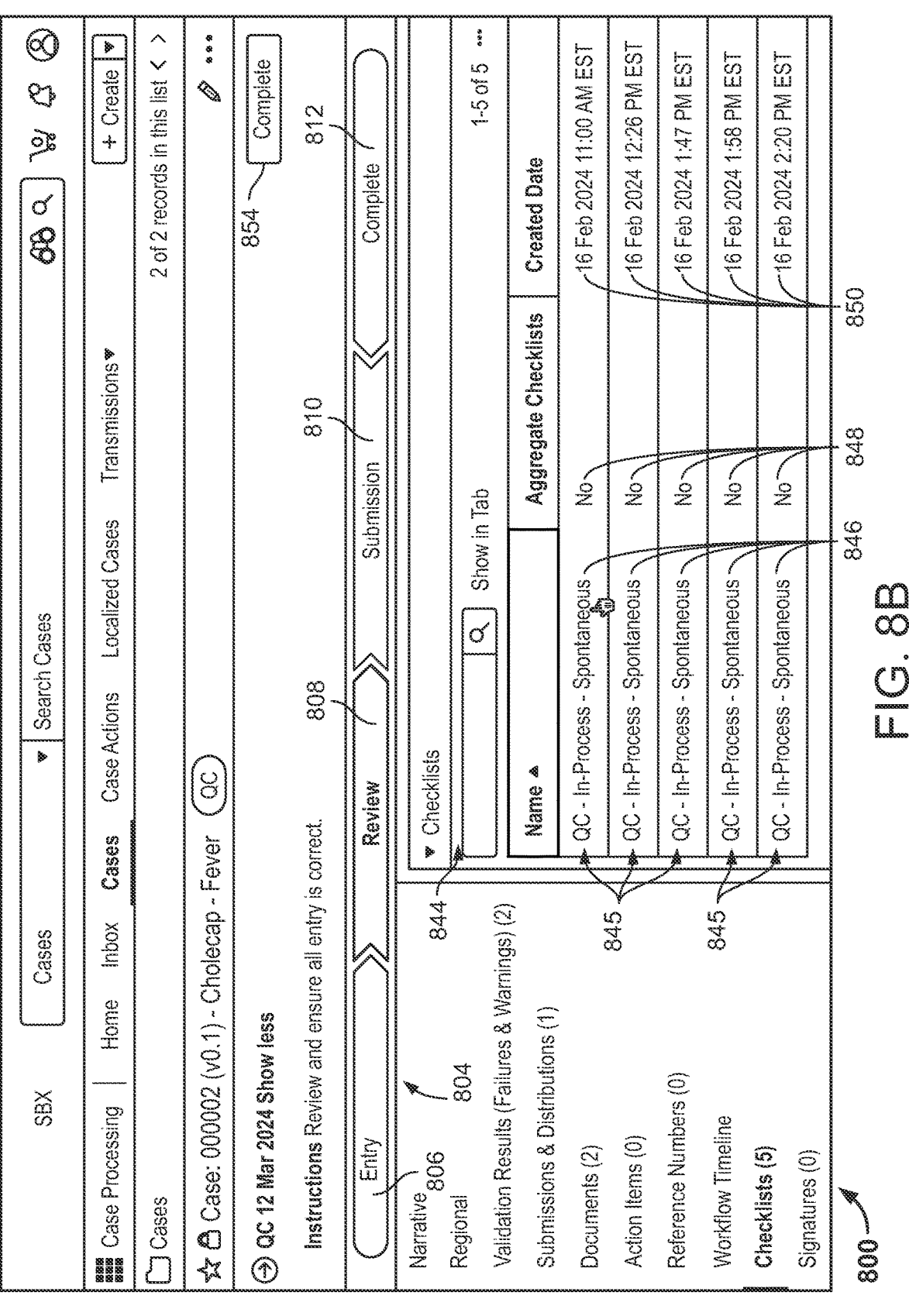

Referring now to FIGS. 8A-8B, a case page 800 which can be displayed on a display the I/O circuit 180 of the client computing devices 112, is shown. In general, the case page 800 provides the user an interface to modify, manage, and process a specific case of the customer. As shown, the case page 800 includes a state section 804, a web form or checklist section 844, a complete data entry button 840, and a complete QC button 854. To render or generate the case the case dataset and the case data of the case dataset to the client computing device 112.

The case state section 804 may include and indicate the current state of the case dataset. For instance, the case state section 804 includes a first phase or stage field 806, a second phase or stage field 808, a third phase or stage field 810, and a fourth phase or stage field 812. Each of the stage fields may be highlighted or colored, when the case dataset has reached or passed that specific stage. For instance, in response to the state of the case being modified from the first stage to the second stage (e.g., as shown in the transition between FIG. 8A and FIG. 8B), the first stage field 806 may be highlighted or modified to include color and the second stage field 808 may be highlighted or modified to include color. In some embodiments, the case state section 804 may include more or less than four case stage fields (e.g., five case stage fields for five case stages, six case stage fields for six case stages, etc.).

In some embodiments, in response to a case being generated, the provider computing system 104 sets the case state of the generated case dataset at the first or beginning stage. Further, the case page 800 may include the complete data entry button 840. Then, in response to a selection of the complete data entry button 840, the respective client computing device 112 may generate a request to modify the state of the case dataset, which may be provided to the provider computing system 104. In response, the provider computing system 104 may modify the state of the case dataset from the first stage to the second stage, which may result in the selection of a rule and generation of a web form as described with regard to the method 400. Further, once in the second stage, the case page 800 may include the complete QC button 854.

The complete QC button 854 may be a selectable button that generates a request to modify the state of the case dataset from the second stage to a third stage. For instance, in response to the complete QC button 854 being selected, the respective client computing device 112 may generate a request to modify the state of the case dataset, which may be provided to the provider computing system 104. If the provider computing system determines QC review has been completed (e.g., QC review was bypassed based on a bypass parameter, QC review was completed based on the client computing device completing the QC web form, etc.), the provider computing system 104 may modify the state of the case dataset from the second stage to a third stage. In comparison, if the provider computing system 104 determines QC review has not been completed (e.g., QC review was not bypassed as the rule did not include a bypass parameter, the QC web form has not been responded to or filled out to generate input data, the score of the input indicated QC was not complete, etc.), the provider computing system 104 may generate a notification that QC was not completed and display it on the case page 800.

In some embodiments, to modify the case dataset from the third stage to the fourth stage, the provider computing system 104 may output the case dataset. Then, in response to outputting the case dataset, the provider computing system 104 may modify the case dataset from the third stage to the fourth stage.

The web form section 844 provides the user of the respective client computing device 112 with an interface to view and manage web forms associated with or generated based on the case of the case page 800. As shown, the web form section 844 includes one or more web form representations 845, which each represent a single web form. In this regard, each web form representation 845 includes a name field 846, an aggregate field 848, and a created date field 850. The name field 846 may be a field through which the user of the respective client computing device 112 can review, edit, and/or initially set the name of the web form. Likewise, the aggregate checklist field 848 may be a field through which the user of the respective client computing device 112 can review, edit, and/or initially set an aggregate checklist preference of the web form. Lastly, the created date field may be a field through which the provider computing system 104 can set the created date and time of the web form.

Referring now to FIG. 9, the web form page 900 which can be displayed on a display the I/O circuit 180 of the client computing device 112, is shown. In general, the web form page 1900 provides the user an interface to modify, manage, and submit the web form generated by the provider computing system 104. While not shown, the web form and the web form page 900 includes multiple question or text sections such as the instructions section (not shown), the basic case details section 904, and a review section (not shown). Each question or inquiry section includes multiple questions including text data (e.g., a text label "Patient Initials," etc.) and a field (e.g., a text field, a drop-down box including multiple options, multiple selectable options, etc.) for providing a response to the question. In some embodiments, the text field may be prepopulated with case data, as described herein. As shown, the basic case details section 904 includes a question including text data such as the report type question and multiple options including the first selectable option 906, the second selectable option 908, and the third selectable option 910. Further, the web form page 900 includes a cancel button 912, and a next or review button 914 for navigating the sections of the web form.

It should be noted that step 436 of the method 400 may include the outputting and display of each of the text sections of the web form (each including multiple questions including text data) for display on the user interface, as shown in FIG. 9. For instance, the provider computing system 104 may provide the web form including the multiple text sections for display on the user interface of a respective client computing device 112. Then, in response to the user of the client computing device 112 providing answers or responses (e.g., input data), and selecting a complete button (not shown), the client computing device 112 may provide the updated web form including the input data to the provider computing system 104, as described with regard to step 440 of the method 400.

Additionally, as described herein, the text data of the web form page 900 (e.g., the questions (e.g., "A1.1 Report Type" "0-No Anomalies Found, etc.), may be generated and displayed in a specific language of the user or the country in which the case dataset originated. For instance, in response to the user's primary language being English, the web form page 900 may include the text data in English, as shown. In comparison, in response to the user's primary language being Spanish, the web form page 900 may include the text data in Spanish.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components structured to execute instructions provided by the memory. The one or more processors may take the form of a single core processor, a multi-core processor (e.g., dual core, quad core, etc.), micro-processor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, each of the circuits described herein may be distributed across one or more locations (e.g., each as part of one or more remote servers).

An example system for implementing the overall system or portions of the embodiments might include a general-purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general-purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that the term "field," as described herein may include any form of an input field through which the user interfaces shown and described may receive input from a user of a computing device. For instance, the term "field" may include a text field, a drop-down box and selectable options, a list box, a lookup box, a search bar, an icon, one or more checkboxes, one or more radio buttons, a button, a toggle, a date field, a slider, and the like. Further, each "field" may include and/or receive data that may be associated with a data object as described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for progressing a state of a case dataset comprising:

receiving, by a provider computing system, a source file;

determining, by the provider computing system, case data based on the source file;

generating, by the provider computing system, the case dataset including the case data and the state in a first stage;

modifying, by the provider computing system, the state of the case dataset from the first stage to a second stage;

selecting, by the provider computing system, a rule including a rule criteria and a sampling ratio from a first repository of the provider computing system;

determining, by the provider computing system, the sampling ratio of the rule is fulfilled;

determining, by the provider computing system and in response to the sampling ratio being fulfilled, the case data of the case dataset fulfills the rule criteria;

selecting, by the provider computing system, a web form template from a second repository of the provider computing system;

generating, by the provider computing system, a web form based on the web form template;

outputting, by the provider computing system, the web form;

receiving, by the provider computing system, input data; and modifying, by the provider computing system, the state of the case dataset from the second stage to a third stage based on the input data.

2. The method of claim 1, further comprising:

outputting, by the provider computing system, the case dataset including the case data as an E2B XML file; and modifying, by the provider computing system and in response to outputting the case dataset, the state of the case dataset from the third stage to a fourth stage.

3. The method of claim 1, further comprising:

locking, by the provider computing system and in response to modifying the state of the case dataset from the first stage to the second stage, the case dataset;

receiving, by the provider computing system, a request to modify the locked case dataset; and denying, by the provider computing system, the request to modify the locked case dataset.

4. The method of claim 3, wherein denying the request to modify the locked case dataset comprises:

generating, by the provider computing system, a notification indicating the case dataset is locked; and outputting, by the provider computing system, the notification.

5. The method of claim 1, wherein the case data includes a country of origin, wherein the web form template includes first text data in a first language and second text data in a second language, and wherein the method further comprises:

determining, by the provider computing system, a language of the case dataset based on the country of origin; and generating, by the provider computing system and in response to the language of the case dataset being the first language, the web form including the first text data in the first language based on the web form template.

6. The method of claim 1, wherein the web form template includes text data in a first language, and wherein the method further comprises:

assigning, by the provider computing system, the web form to a user account;

determining, by the provider computing system, a language of the user account;

translating, by the provider computing system and in response to the language of the user account being a second language, the text data of the web form template from the first language to the second language; and generating, by the provider computing system, the web form including the translated text data.

7. The method of claim 1, wherein the rule is a first rule, wherein the rule criteria is a first rule criteria, wherein the sampling ratio is a first sampling ratio, and wherein the method further comprises:

selecting, by the provider computing system, a second rule including a second rule criteria and a second sampling ratio from the first repository of the provider computing system;

determining, by the provider computing system, the second sampling ratio is not fulfilled; and selecting, by the provider computing system and in response to determining the second sampling ratio is not fulfilled, the first rule including the first rule criteria and the first sampling ratio from the first repository of the provider computing system.

8. The method of claim 1, wherein the rule is a first rule, wherein the rule criteria is a first rule criteria, and wherein the method further comprises:

selecting, by the provider computing system, a second rule including a second rule criteria from the first repository of the provider computing system;

determining, by the provider computing system, the case data of the case dataset does not fulfill the second rule criteria; and selecting, by the provider computing system and in response to determining the case data of the case dataset does not fulfill the second rule criteria, the first rule including the first rule criteria and the sampling ratio from the first repository of the provider computing system.

9. The method of claim 8, wherein the first rule and the second rule each include a rank, wherein the second rule is selected based on the rank of the second rule being a first rank, and wherein the first rule is selected, in response to determining the case data of the case dataset does not fulfill the second rule criteria, based on the rank of the first rule being a second rank.

10. The method of claim 1, wherein the rule includes a rule trigger, and wherein the rule is selected from the first repository of the provider computing system based on the state of the case dataset fulfilling the rule trigger of the rule.

11. The method of claim 1, wherein the web form includes one or more text sections, wherein the web form is output to a client computing device for display on a user interface including the one or more text sections, and wherein the input data is received from the client computing device via the one or more text sections of the user interface.

12. A method for progressing a state of a case dataset comprising:

selecting, by a provider computing system, the case dataset including case data and the state in a first stage from a first repository of the provider computing system;

selecting, by the provider computing system, a rule including a rule criteria and a rule trigger from a second repository of the provider computing system based on the state of the case dataset fulfilling the rule trigger of the rule;

determining, by the provider computing system, the case data of the case dataset fulfills the rule criteria;

selecting, by the provider computing system, a web form template from a third repository of the provider computing system;

generating, by the provider computing system, a web form based on the web form template;

outputting, by the provider computing system, the web form;

receiving, by the provider computing system, input data; and modifying, by the provider computing system, the state of the case dataset from the first stage to a second stage based on the input data.

13. The method of claim 12, wherein the case data includes a country of origin, wherein the web form template includes first text data in a first language and second text data in a second language, and wherein the method further comprises:

determining, by the provider computing system, a language of the case dataset based on the country of origin; and generating, by the provider computing system and in response to the language of the case dataset being the first language, the web form including the first text data in the first language based on the web form template.

14. The method of claim 12, wherein the web form template includes text data in a first language, and wherein the method further comprises:

assigning, by the provider computing system, the web form to a user account;

determining, by the provider computing system, a language of the user account;

translating, by the provider computing system and in response to the language of the user account being a second language, the text data of the web form template from the first language to the second language; and generating, by the provider computing system, the web form including the translated text data.

15. The method of claim 12, wherein the rule is a first rule, wherein the rule criteria is a first rule criteria, wherein the rule trigger is a first rule trigger, and wherein the method further comprises:

selecting, by the provider computing system, a second rule including a second rule criteria, a rule trigger, and a sampling ratio from the second repository of the provider computing system based on the state of the case dataset fulfilling the second rule trigger of the second rule;

determining, by the provider computing system, the sampling ratio is not fulfilled; and selecting, by the provider computing system and in response to determining the second sampling ratio is not fulfilled, the first rule including the first rule criteria and the first rule trigger from the second repository of the provider computing system based on the state of the case dataset fulfilling the first rule trigger of the first rule.

16. The method of claim 12, wherein the rule is a first rule, wherein the rule criteria is a first rule criteria, and wherein the method further comprises:

selecting, by the provider computing system, a second rule including a second rule criteria from the second repository of the provider computing system;

determining, by the provider computing system, the case data of the case dataset does not fulfill the second rule criteria; and selecting, by the provider computing system and in response to determining the case data of the case dataset does not fulfill the second rule criteria, the first rule including the first rule criteria and the rule trigger from the second repository of the provider computing system based on the state of the case dataset fulfilling the first rule trigger of the first rule.

17. The method of claim 12, wherein the web form includes one or more text sections, wherein the web form is output to a client computing device for display on a user interface including the one or more text sections, and wherein the input data is received from the client computing device via the one or more text sections of the user interface.

18. A method for progressing a state of a case dataset comprising:

selecting, by a provider computing system, the case dataset including case data and the state in a first stage from a first repository of the provider computing system;

selecting, by the provider computing system, a first rule including a first rule criteria and a first sampling ratio from a second repository of the provider computing system;

determining, by the provider computing system, the first sampling ratio of the first rule is not fulfilled;

selecting, by the provider computing system and in response to the first sampling ratio of the first rule not being fulfilled, a second rule including a second rule criteria, a second sampling ratio, and a bypass parameter from the second repository of the provider computing system;

determining, by the provider computing system, the second sampling ratio of the second rule is fulfilled;

determining, by the provider computing system and in response to second sampling ratio being fulfilled, the case data of the case dataset fulfills the second rule criteria;

modifying, by the provider computing system and in response to the second rule including the bypass parameter, the state of the case dataset from the first stage to a second stage.

19. The method of claim 18, wherein the case data includes a quality control (QC) review bypass field indicating whether the state of the case dataset was modified from the first stage to the second stage based on the bypass parameter, and wherein the method further comprises:

modifying, by the provider computing system, the QC review bypass field of the case data to true.

20. The method of claim 18, wherein the first rule and the second rule each include a rank, wherein the first rule is selected based on the rank of the first rule being a first rank, and wherein the second rule is selected, in response to determining the first sampling ratio of the first rule is not fulfilled, based on the rank of the second rule being a second rank.

* * * * *